US012592078B2

(12) United States Patent
Minagawa et al.

(10) Patent No.: US 12,592,078 B2
(45) Date of Patent: Mar. 31, 2026

(54) VIDEO MONITORING DEVICE, VIDEO MONITORING SYSTEM, VIDEO MONITORING METHOD, AND STORAGE MEDIUM STORING VIDEO MONITORING PROGRAM

(71) Applicant: Mitsubishi Electric Corporation, Tokyo (JP)

(72) Inventors: Jun Minagawa, Tokyo (JP); Kohei Okahara, Tokyo (JP); Kento Yamazaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 351 days.

(21) Appl. No.: 18/215,428

(22) Filed: Jun. 28, 2023

(65) Prior Publication Data

US 2023/0343103 A1 Oct. 26, 2023

Related U.S. Application Data

(63) Continuation of application No. PCT/JP2021/006571, filed on Feb. 22, 2021.

(51) Int. Cl.
G06V 20/52 (2022.01)
G06T 7/292 (2017.01)
(Continued)

(52) U.S. Cl.
CPC ............. G06V 20/52 (2022.01); G06T 7/292 (2017.01); G06T 7/70 (2017.01); G06V 10/26 (2022.01);
(Continued)

(58) Field of Classification Search
CPC ...... G06V 20/52; G06V 10/26; G06V 10/761; G06V 2201/07; G06T 7/292; G06T 7/70;
(Continued)

(56) References Cited

U.S. PATENT DOCUMENTS 10,896,327 B1 * 1/2021 Lablans ................. G06V 10/25
2002/0052708 A1 5/2002 Pollard et al.
(Continued)

FOREIGN PATENT DOCUMENTS

JP 2005-142683 A 6/2005
JP 2006-270404 A 10/2006
(Continued)

OTHER PUBLICATIONS

European Office Action for European Application No. 21 926 619.4, dated Jun. 23, 2025.
(Continued)

*Primary Examiner* — Siamak Harandi
*Assistant Examiner* — Andrew S Budisalich
(74) *Attorney, Agent, or Firm* — Birch, Stewart, Kolasch & Birch, LLP

(57) ABSTRACT

A video monitoring device includes processing circuitry to acquire position information indicating a position of a mobile object; to command image capturing directions of a plurality of movable cameras provided at predetermined positions; to evaluate a viewability level of the mobile object in a video captured by each of the plurality of movable cameras based on the position of the mobile object and the positions of the plurality of movable cameras; to select a movable camera for use for image capturing of the mobile object from the plurality of movable cameras based on the viewability level; and to display the video of the mobile object captured by the selected movable camera, wherein the viewability level is evaluated based on an angular speed of swiveling of each of the plurality of movable cameras necessary for each of the plurality of movable cameras to keep sight of the mobile object.

13 Claims, 18 Drawing Sheets

(51) Int. Cl.

| | |
|---|---|
| *G06T 7/70* | (2017.01) |
| *G06V 10/26* | (2022.01) |
| *G06V 10/74* | (2022.01) |
| *G08B 13/196* | (2006.01) |
| *H04N 7/18* | (2006.01) |
| *H04N 23/695* | (2023.01) |
| *H04N 23/90* | (2023.01) |

(52) U.S. Cl.
CPC ......... *G06V 10/761* (2022.01); *H04N 23/695* (2023.01); *H04N 23/90* (2023.01); *G06V 2201/07* (2022.01)

(58) Field of Classification Search
CPC ........... G06T 2207/10024; G06T 2207/10028; H04N 23/695; H04N 23/90; H04N 7/181; G08B 13/19608
See application file for complete search history.

(56) References Cited

U.S. PATENT DOCUMENTS

| | | | | |
|---|---|---|---|---|
| 2011/0199487 | A1* | 8/2011 | Husoy | H04N 7/181 |
| | | | | 348/E7.085 |
| 2012/0154522 | A1* | 6/2012 | Yoo | H04N 23/90 |
| | | | | 348/36 |

| | | | | |
|---|---|---|---|---|
| 2016/0065944 | A1 | 3/2016 | Fujii et al. | |
| 2021/0019627 | A1* | 1/2021 | Zhang | G06N 3/08 |
| 2021/0195096 | A1* | 6/2021 | Keskikangas | G08B 13/19641 |
| 2023/0033760 | A1* | 2/2023 | Stroppiana | G05D 1/101 |

FOREIGN PATENT DOCUMENTS

| | | | |
|---|---|---|---|
| JP | 2013-223104 | A | 10/2013 |
| JP | 2015-213251 | A | 11/2015 |
| JP | 2016-12752 | A | 1/2016 |
| JP | 2016-59014 | A | 4/2016 |
| JP | 2016-127571 | A | 7/2016 |
| JP | 2017-169076 | A | 9/2017 |
| WO | WO 2014/148394 | A1 | 9/2014 |

OTHER PUBLICATIONS

International Search Report (PCT/ISA/210), issued in PCT/JP2021/006571, dated May 18, 2021.

Japanese Notice of Reasons for Refusal, issued in counterpart Application No. 2021-538825, dated Nov. 9, 2021.

Extended European Search Report for European Application No. 21926619.4, dated Feb. 13, 2024.

* cited by examiner

FIG. 1

VIDEO MONITORING DEVICE, VIDEO MONITORING SYSTEM, VIDEO MONITORING METHOD, AND STORAGE MEDIUM STORING VIDEO MONITORING PROGRAM

CROSS-REFERENCE TO RELATED APPLICATION

This application is a continuation application of International Application No. PCT/JP2021/006571 having an international filing date of Feb. 22, 2021.

BACKGROUND OF THE INVENTION

1. Field of the Invention

The present disclosure relates to a video monitoring device, a video monitoring system, a video monitoring method and a storage medium storing a video monitoring program.

2. Description of the Related Art

There has been proposed a system that selects a camera currently capturing an image suitable for image processing from a plurality of cameras and performs the image processing on the image captured by the selected camera. See Patent Reference 1, for example.

Patent Reference 1: Japanese Patent Application Publication No. 2013-223104

However, the aforementioned conventional system is incapable of automatically selecting a PTZ (pan-tilt-zoom) camera capable of appropriately keeping sight of a mobile object from a plurality of PTZ cameras as movable cameras capable of changing the image capturing direction.

SUMMARY OF THE INVENTION

An object of the present disclosure is to provide a video monitoring device, a video monitoring system, a video monitoring method and a video monitoring program that make it possible to automatically select a movable camera capable of appropriately keeping sight of a mobile object from a plurality of movable cameras.

A video monitoring device in the present disclosure includes processing circuitry to acquire position information indicating a position of a mobile object as a moving target object; to command image capturing directions of a plurality of movable cameras provided at predetermined positions; to evaluate a viewability level of the mobile object in a video captured by each of the plurality of movable cameras based on the position of the mobile object and the positions of the plurality of movable cameras; to select a movable camera for use for image capturing of the mobile object from the plurality of movable cameras based on the viewability level; and to display the video of the mobile object captured by the selected movable camera on a monitor screen, wherein the viewability level is evaluated based on an angular speed of swiveling of each of the plurality of movable cameras necessary for each of the plurality of movable cameras to keep sight of the mobile object.

A video monitoring method in the present disclosure is a method executed by a computer, including acquiring position information indicating a position of a mobile object as a moving target object; commanding image capturing directions of a plurality of movable cameras provided at predetermined positions; evaluating a viewability level of the mobile object in a video captured by each of the plurality of movable cameras based on the position of the mobile object and the positions of the plurality of movable cameras; selecting a movable camera for use for image capturing of the mobile object from the plurality of movable cameras based on the viewability level; and displaying the video of the mobile object captured by the selected movable camera on a monitor screen, wherein the viewability level is evaluated based on an angular speed of swiveling of each of the plurality of movable cameras necessary for each of the plurality of movable cameras to keep sight of the mobile object.

According to the present disclosure, a movable camera capable of appropriately keeping sight of a mobile object can be automatically selected from a plurality of movable cameras.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a diagram showing examples of a viewability level;

DETAILED DESCRIPTION OF THE INVENTION

Figure 2:
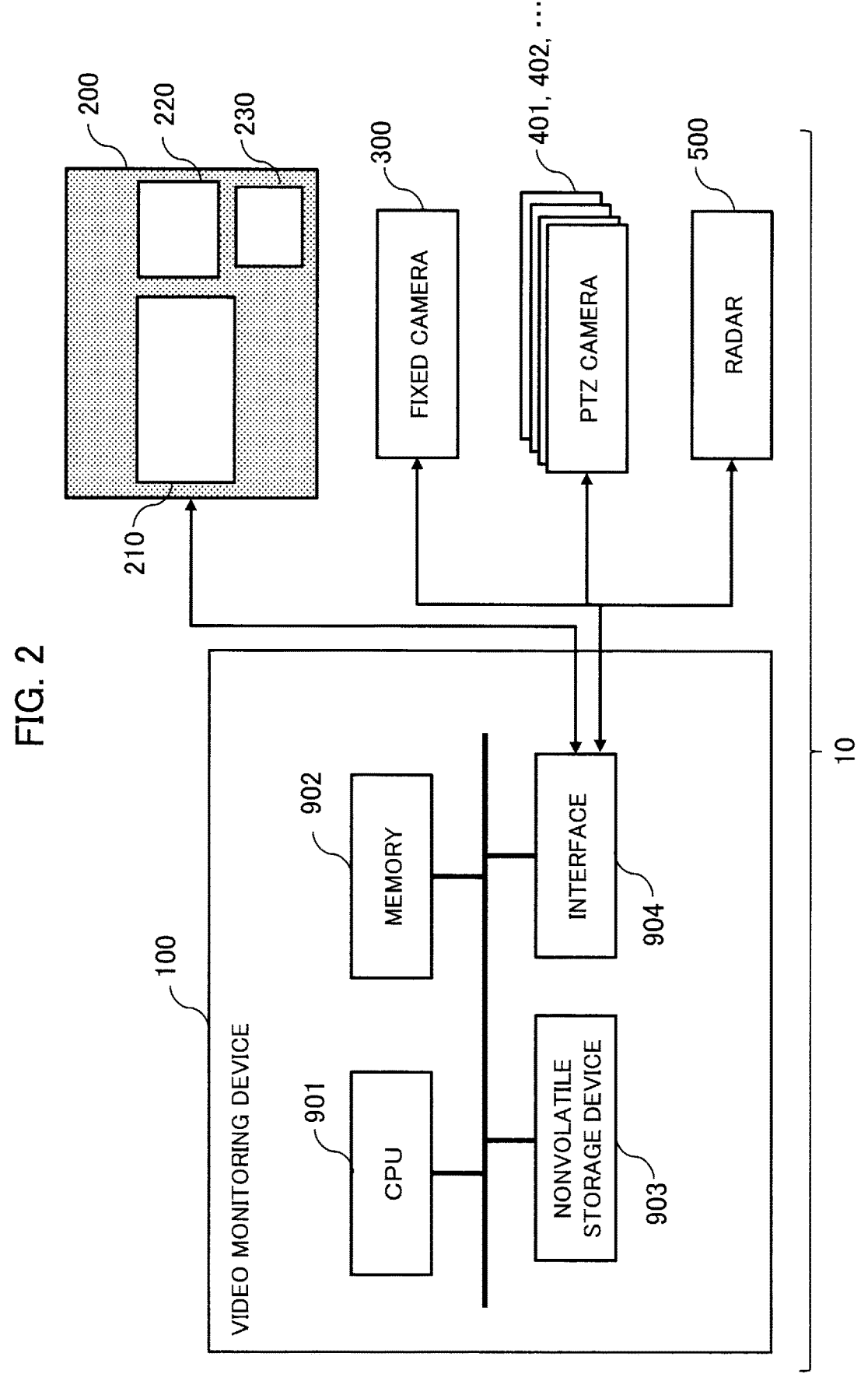
FIG. 2 is a diagram showing a hardware configuration of a video monitoring device and a video monitoring system according to the first embodiment.

A video monitoring device, a video monitoring system, a video monitoring method and a video monitoring program according to each embodiment will be described below with reference to the drawings. The following embodiments are just examples and it is possible to appropriately combine embodiments and appropriately modify each embodiment.

The video monitoring device in the present disclosure is capable of evaluating a "viewability level" of a mobile object, as a moving target object (i.e., monitoring target), in a video captured by each of a plurality of movable cameras based on the position of the mobile object and the positions of the plurality of movable cameras provided at predetermined positions and automatically selecting a movable camera for use for the image capturing of the mobile object from the plurality of movable cameras based on the viewability level. The movable camera is a camera capable of changing the image capturing direction, such as a PTZ camera. The movable camera is referred to also as a swivel camera.

Figure 1:
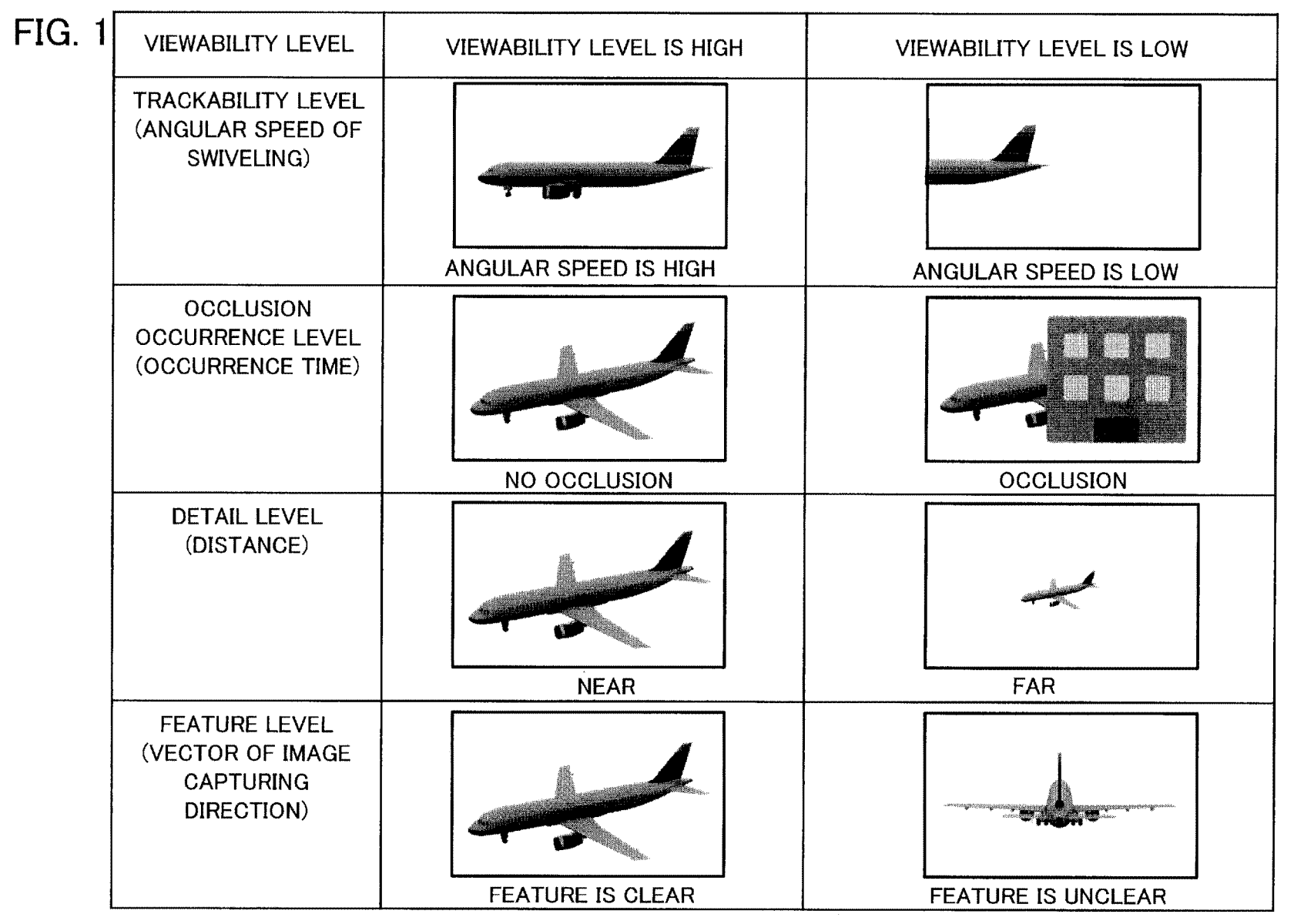

FIG. 1 is a diagram showing examples of the viewability level. The viewability level represents the level of viewability when a video of a mobile object being captured by a movable camera is viewed on a monitor screen by an observer (referred to also as a "user"). As shown in FIG. 1, the viewability level can be evaluated based on one or more of a trackability level, an occlusion occurrence level, a detail level and a feature level. With the increase in the viewability level, the observer can more appropriately monitor the mobile object in the video displayed on the monitor screen.

As shown in FIG. 1, the trackability level is high when the angular speed of the swiveling of the movable camera is sufficiently high (i.e., when the movable camera is capable of keeping sight of the moving mobile object), and is low when the angular speed of the swiveling of the movable camera is low (i.e., when the movable camera is incapable of keeping sight of the moving mobile object and part or the whole of the mobile object disappears from the video). The viewability level is high when the trackability level is high, and the viewability level is low when the trackability level is low. "The movable camera keeps sight of the moving mobile object" means that the direction of the movable camera capable of swiveling (i.e., the image capturing direction) keeps pointing towards the mobile object. The "swiveling" includes horizontal swiveling (pan) and vertical swiveling (tilt).

As shown in FIG. 1, the occlusion occurrence level is low when no occlusion occurs (i.e., when no screening object exists between the movable camera and the moving mobile object) when the moving mobile object is tracked for a predetermined time, and is high when occlusion occurs (i.e., when a screening object exists between the movable camera and the moving mobile object and a blind spot is caused by the screening object) when the moving mobile object is tracked for a predetermined time. Further, the occlusion occurrence level becomes higher as an occlusion occurrence time becomes longer. The viewability level is high when the occlusion occurrence level is low, and the viewability level is low when the occlusion occurrence level is high.

As shown in FIG. 1, the detail level is high when the distance from the movable camera to the mobile object is short (i.e., when the mobile object is captured in a large size), and is low when the distance from the movable camera to the mobile object is long (i.e., when the mobile object is captured in a small size). The viewability level is high when the detail level is high, and the viewability level is low when the detail level is low.

As shown in FIG. 1, the feature level is determined based on from which direction the movable camera is capturing the image of the mobile object. The feature level is high when the image capturing direction of the movable camera is a direction for clearly grasping a feature of the mobile object (e.g., when the image of the mobile object is captured in a desirable image capturing direction predetermined for each type of the mobile object), and is low when the image capturing direction of the movable camera is a direction in which the feature of the mobile object is not grasped clearly (e.g., when the image of the mobile object is captured in a direction different from the predetermined desirable image capturing direction). The viewability level is high when the feature level is high, and the viewability level is low when the feature level is low. Further, the desirable image capturing direction can also be a direction designated by an operation performed by the user.

In a first embodiment, a description will be given of an example in which the viewability level is evaluated based on the trackability level.

In a second embodiment, a description will be given of an example in which the viewability level is evaluated based on the occlusion occurrence level.

In a third embodiment, a description will be given of an example in which the viewability level is evaluated based on a combination of the trackability level and the feature level.

In a fourth embodiment, a description will be given of an example in which the viewability level is evaluated based on a combination of the trackability level and the detail level.

However, the viewability level may also be evaluated based on a different combination of the trackability level, the occlusion occurrence level, the detail level and the feature level. Specifically, the viewability level may also be evaluated based on any one of a combination of the trackability level and the occlusion occurrence level, a combination of the trackability level, the detail level and the feature level, a combination of the occlusion occurrence level and the detail level, a combination of the occlusion occurrence level and the feature level, a combination of the occlusion occurrence level, the detail level and the feature level, a combination of the trackability level, the occlusion occurrence level and the detail level, a combination of the trackability level, the occlusion occurrence level and the feature level, and a combination of the trackability level, the occlusion occurrence level, the detail level and the feature level.

First Embodiment

FIG. 2 is a diagram showing a hardware configuration of a video monitoring device 100 and a video monitoring system 10 according to the first embodiment. The video monitoring system 10 includes the video monitoring device 100, a monitoring panel 200, one or more fixed cameras 300 each being a fixed camera for capturing a wide area, a plurality of PTZ cameras 401, . . . , as movable cameras each for capturing a narrow area, and a radar 500 that detects the position of the mobile object. The monitoring panel 200 includes a wide area monitor screen 210, a narrow area monitor screen 220, and a user operation unit 230 (shown in FIG. 4 which will be explained later). The monitoring panel 200 may also be configured as a part of the video monitoring device 100.

The video monitoring device 100 includes processing circuitry. The video monitoring device 100 is a computer, for example. In the example of FIG. 2, the processing circuitry of the video monitoring device 100 includes a CPU (Central Processing Unit) 901 that is a processor as an information processing unit, a memory 902 as a storage device including a storage medium (i.e., a record medium) for storing a program, a nonvolatile storage device 903 such as a hard disk drive (HDD) or a solid state drive (SSD), and an interface 904. The storage medium may be a non-transitory computer-readable storage medium storing a program such as the video monitoring program. The memory 902 is, for example, a nonvolatile or volatile semiconductor memory such as a RAM (Random Access Memory), a ROM (Read Only Memory), a flash memory, an EPROM (Erasable Programmable Read Only Memory) or an EEPROM (Electrically Erasable Programmable Read Only Memory).

The memory 902 stores a video monitoring program as software, for example. The CPU 901 is capable of executing a video monitoring method according to the first embodiment by executing the video monitoring program. Furthermore, it is also possible to implement part of functions of the video monitoring device 100 by dedicated hardware and other part of the functions by software or firmware.

Figure 3:
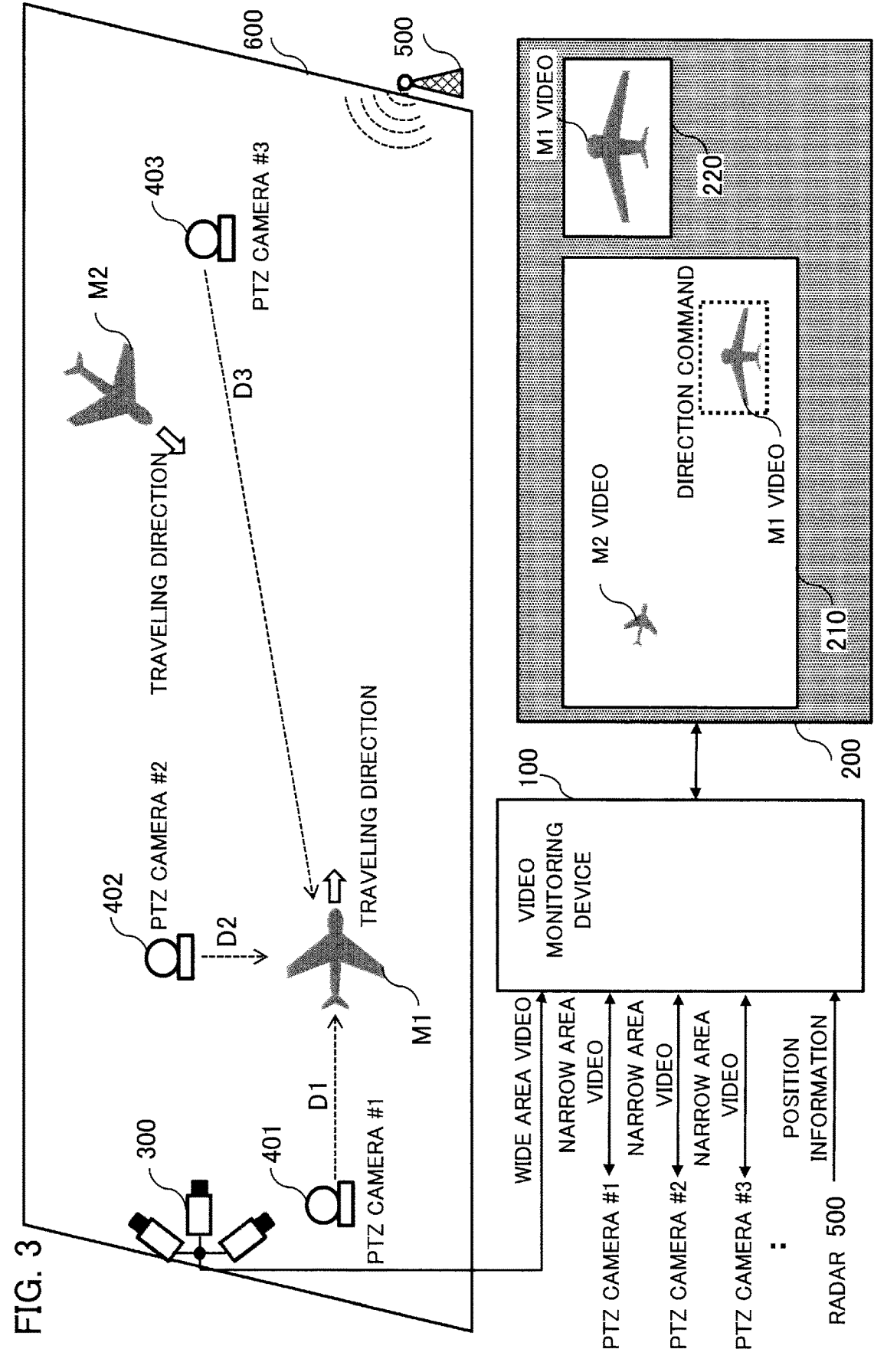
FIG. 3 is a diagram showing an example of employing the video monitoring system according to the first embodiment for monitoring an airplane traveling in an airport.

FIG. 3 is a diagram showing an example of employing the video monitoring system 10 according to the first embodiment for monitoring an airplane traveling in an airport 600. The video monitoring system 10 includes the video monitoring device 100, the monitoring panel 200, the fixed camera 300, the plurality of PTZ cameras (#1-#3) 401-403, and the radar 500 that detects the positions of airplanes M1 and M2 and the like as mobile objects traveling in the airport 600. The video monitoring device 100 displays videos from a plurality of fixed cameras 300 or a synthetic video of videos from a plurality of fixed cameras 300 on the wide area monitor screen 210.

Further, the video monitoring device 100 acquires position information indicating the position of the airplane M1 as a moving monitoring target based on a detection signal from the radar 500, commands image capturing directions D1, D2, D3 of the PTZ cameras (#1-#3) 401-403 provided at predetermined positions, and evaluates (i.e., calculates) the viewability level of the mobile object in the video captured by each of the PTZ cameras (#1-#3) 401-403 based on the position of the airplane M1 and the positions of the PTZ cameras (#1-#3) 401-403. The video monitoring device 100 selects a PTZ camera for use for the image capturing of the airplane M1 from the PTZ cameras (#1-#3) 401-403 based on the viewability level, and displays the video of the airplane M1 captured by the selected PTZ camera on the narrow area monitor screen 220. Furthermore, the airplane as the mobile object as the monitoring target is an airplane that has been designated by the observer through the user operation unit 230, for example.

In the first embodiment, the viewability level is evaluated based on the angular speed of the swiveling of each of the PTZ cameras (#1-#3) 401-403 necessary for each of the PTZ cameras (#1-#3) 401-403 to keep sight of the mobile object.

Figure 4:
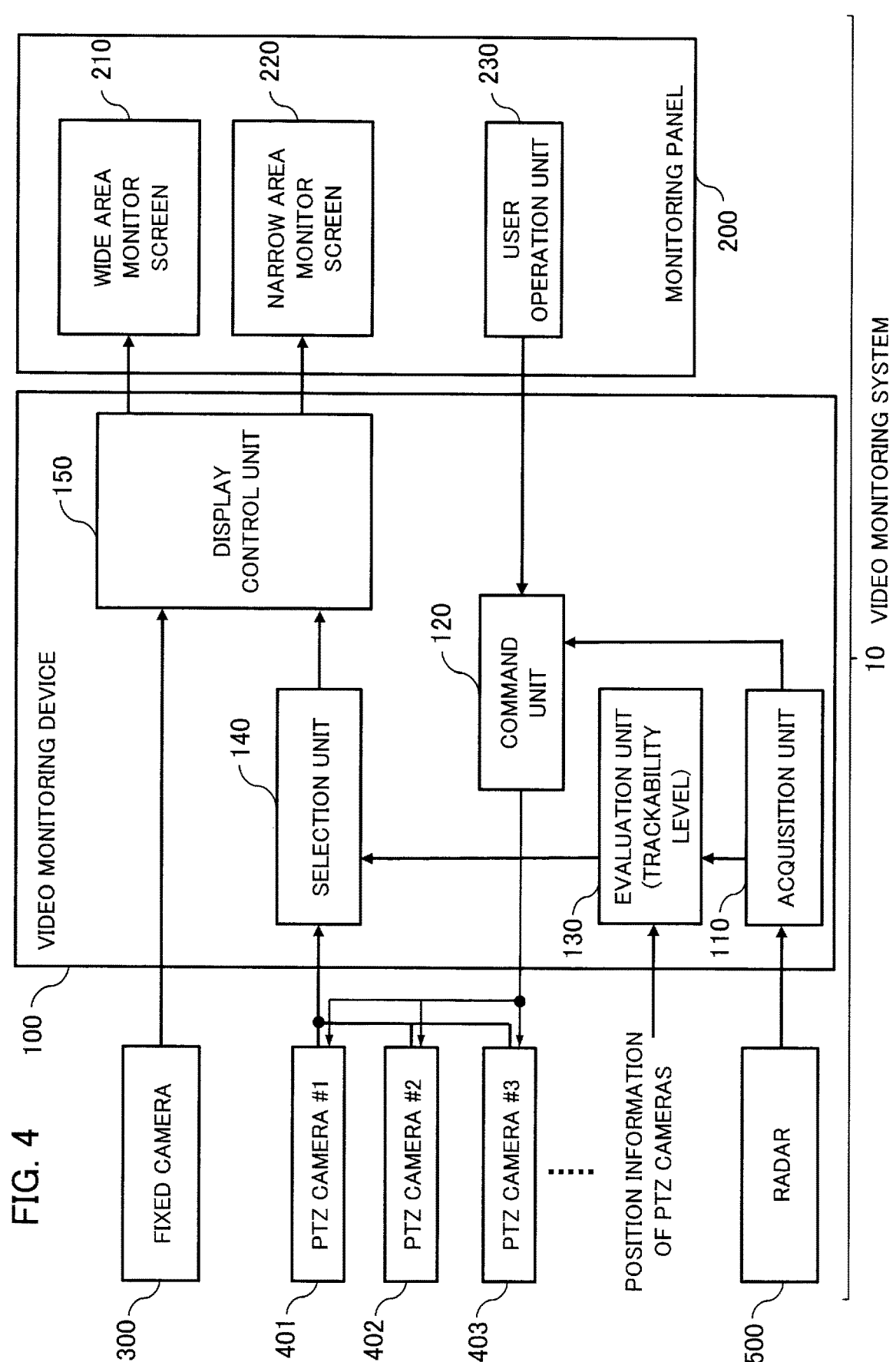
FIG. 4 is a functional block diagram schematically showing a configuration of the video monitoring device and the video monitoring system according to the first embodiment.

FIG. 4 is a functional block diagram schematically showing a configuration of the video monitoring device 100 and the video monitoring system 10 according to the first embodiment. The video monitoring device 100 includes an acquisition unit 110 that acquires the position information indicating the position of the airplane M1 as a moving mobile object, a command unit 120 that commands the image capturing directions of the plurality of PTZ cameras (#1-#3) 401-403 provided at predetermined known positions, and an evaluation unit 130 that evaluates the viewability level of the airplane M1 in the video captured by each of the plurality of PTZ cameras (#1-#3) 401-403 based on the position of the airplane M1 and the positions of the plurality of PTZ cameras (#1-#3) 401-403. Further, the video monitoring device 100 includes a selection unit 140 that selects a PTZ camera for use for the image capturing of the airplane M1 from the plurality of PTZ cameras (#1-#3) 401-403 based on the viewability level and a display control unit 150 that displays the video of the airplane M1 captured by the selected PTZ camera on the narrow area monitor screen 220.

While the acquisition unit 110 acquires the position information on the airplane M1 based on the detection signal from the radar 500, it is also possible to detect the position of the mobile object or the like based on a video from a fixed camera 300 or a synthetic video (e.g., panoramic video, bird's-eye video or the like) of videos from a plurality of fixed cameras 300 In the first embodiment, the evaluation unit 130 evaluates the viewability level based on the angular speed of the swiveling of each of the plurality of PTZ cameras (#1-#3) 401-403 necessary for each of the plurality of PTZ cameras (#1-#3) 401-403 to keep sight of the mobile object. The evaluation unit 130 judges that the viewability level is higher (i.e., the monitoring target is more easily viewable to the observer) with the decrease in the angular speed of the swiveling (i.e., with the increase in the trackability level).

Figure 5:
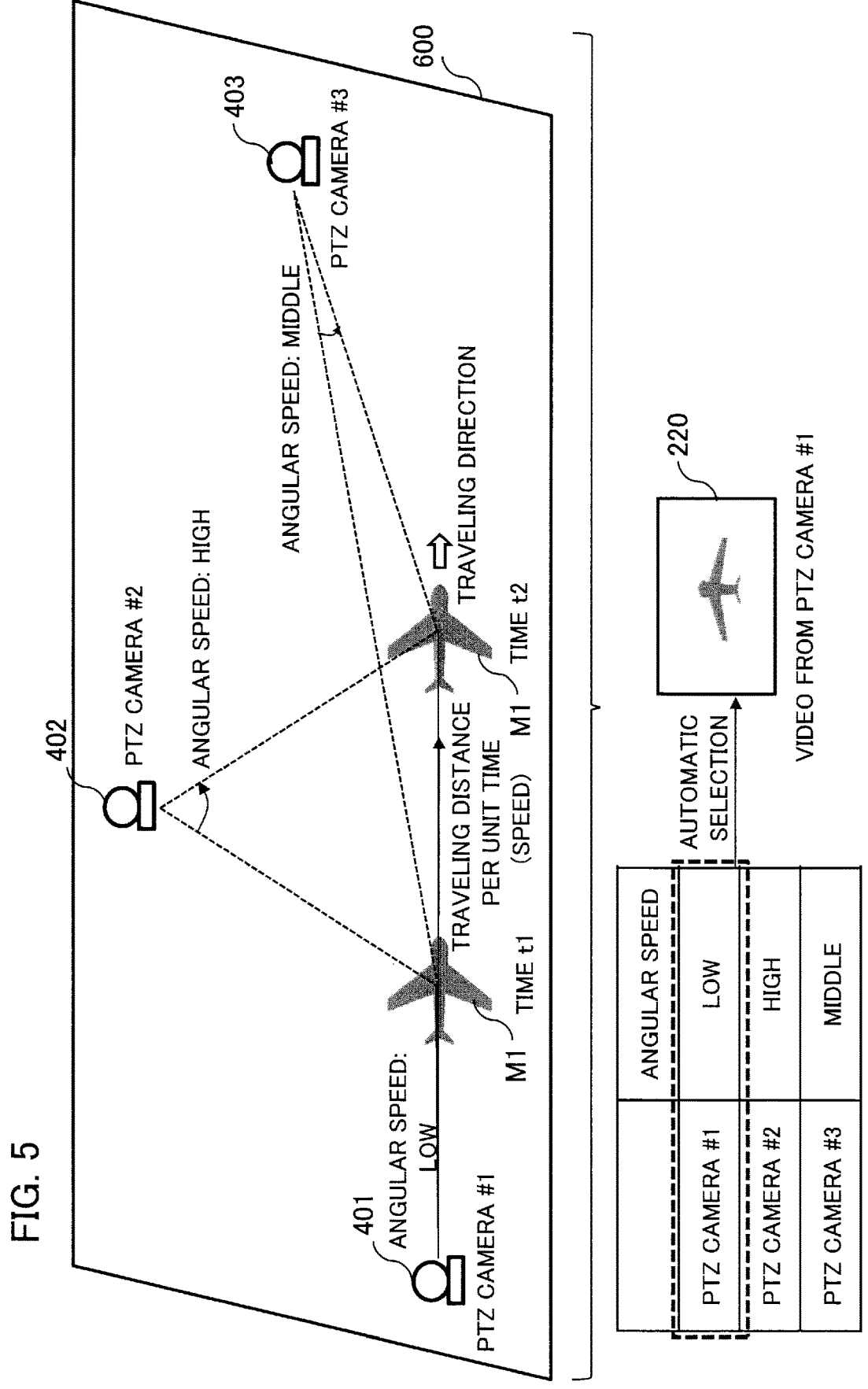
FIG. 5 is a diagram showing a trackability level as an example of the viewability level.

FIG. 5 is a diagram showing the trackability level as an example of the viewability level. Each of the PTZ cameras (#1-#3) 401-403 swivels corresponding to the traveling distance per unit time (i.e., speed) of the airplane M1 as the mobile object as the monitoring target.

In the example of FIG. 5, the angular speed of the swiveling of the PTZ camera (#1) 401 is low. Further, in the example of FIG. 5, the angular speed of the swiveling of the PTZ camera (#2) 402 is high. Furthermore, in the example of FIG. 5, the angular speed of the swiveling of the PTZ camera (#3) 403 is middle. Therefore, the selection unit 140 sends the video from the PTZ camera (#1) 401, regarding which the angular speed of the swiveling is the lowest, to the display control unit 150 and thereby has the video from the PTZ camera (#1) 401 displayed on the narrow area monitor screen 220.

Figures 6A, 6B:
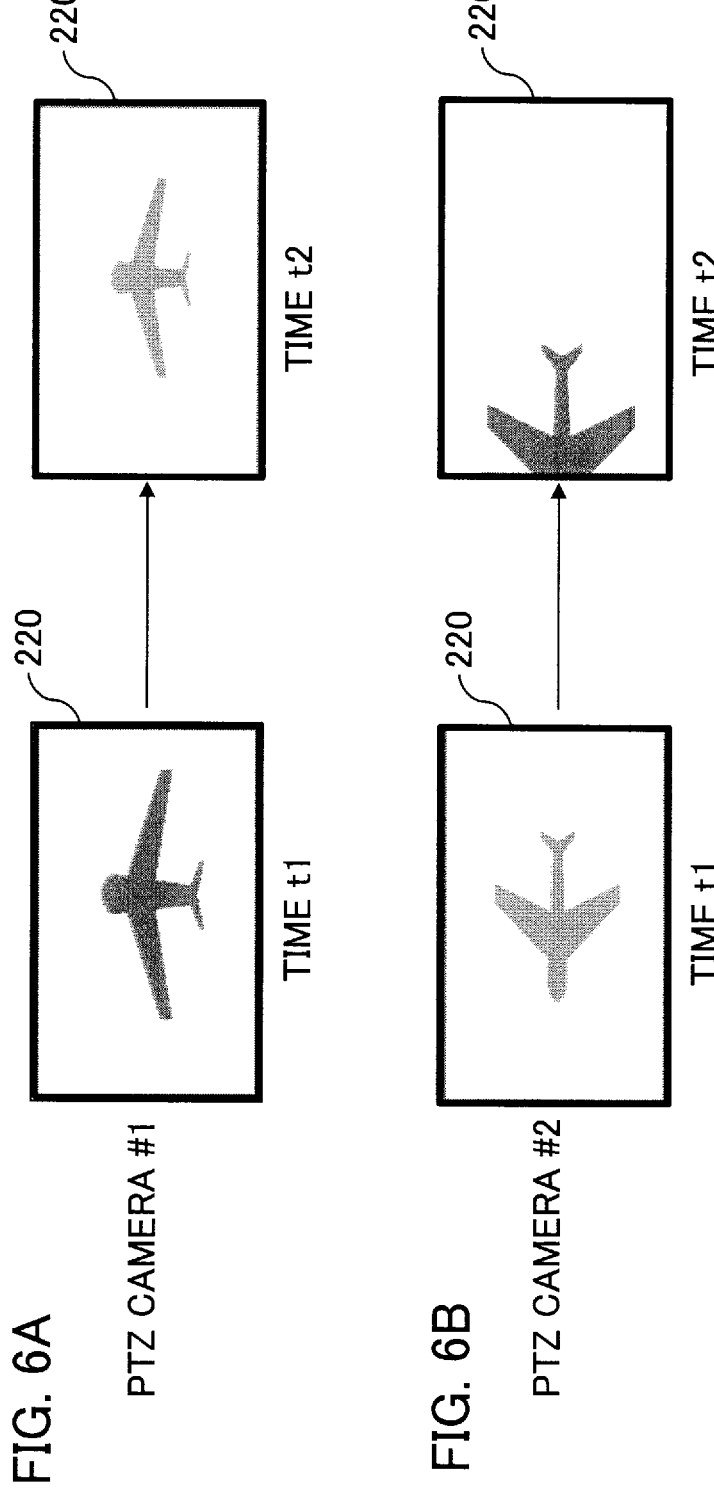
FIG. 6A shows an example in which an angular speed of swiveling is sufficiently high and the trackability level is high.
FIG. 6B shows an example in which the angular speed of the swiveling is low and the trackability level is low.

FIG. 6A shows an example in which the angular speed of the swiveling of the PTZ camera (#1) 401 is sufficiently high and the trackability level is high, and FIG. 6B shows an example in which the angular speed of the swiveling of the PTZ camera (#2) 402 is low and the trackability level is low. In the video captured by the PTZ camera (#1) 401 in FIG. 5, the PTZ camera (#1) 401 has sight of the whole of the airplane M1 as the mobile object at time t1 and keeps sight of the whole of the airplane M1 also at time t2 after the elapse of a certain time period as shown in FIG. 6A. However, as shown in FIG. 6B, the PTZ camera (#2) 402 in FIG. 5 having sight of the whole of the airplane M1 at the time t1 is not fast enough to keep track of the airplane M1 and loses sight of part of the airplane M1 at the time t2 after the elapse of the certain time period.

Figure 7:
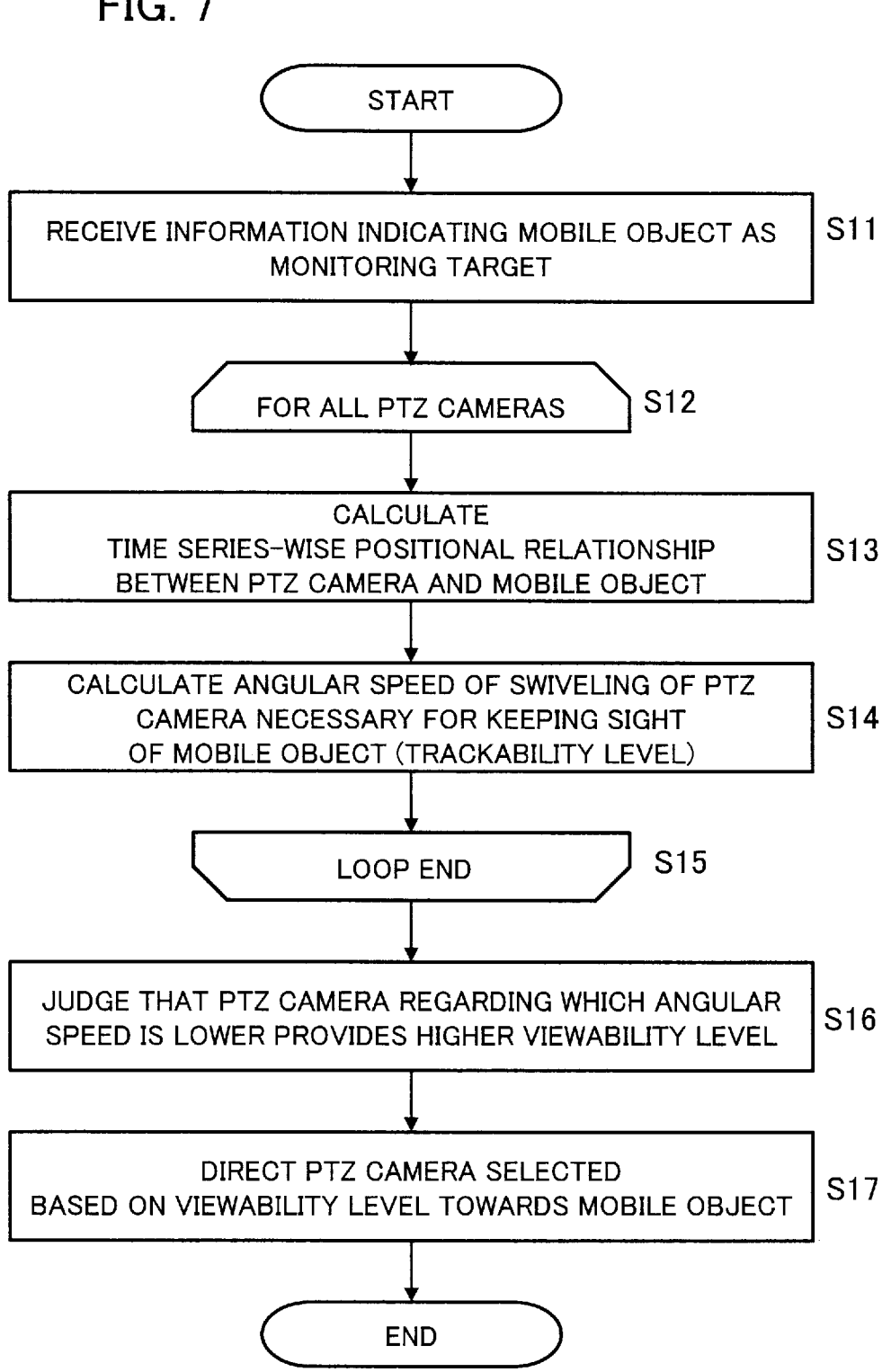
FIG. 7 is a flowchart showing an operation of the video monitoring device according to the first embodiment.

FIG. 7 is a flowchart showing an operation of the video monitoring device according to the first embodiment. First, the acquisition unit 110 acquires the position information indicating the position of the mobile object as the moving monitoring target (in the first embodiment, an airplane traveling in the airport) (step S11).

The evaluation unit 130 executes a process of calculating a time series-wise positional relationship between a PTZ camera and the mobile object (step S13) and calculating the angular speed of the swiveling of the PTZ camera necessary for keeping sight of the mobile object (step S14) for all of the plurality of PTZ cameras (steps S12 to S15). Here, the "time series-wise positional relationship" is a positional relationship between the PTZ camera and the mobile object from a certain time point to a time point after the elapse of a certain time period.

The evaluation unit 130 judges that a PTZ camera regarding which the angular speed of the swiveling is lower provides a higher viewability level (step S16). The command unit 120 directs a PTZ camera selected based on the viewability level towards the mobile object as the monitoring target (step S17). In this case, the command unit 120 selects a PTZ camera that provides the highest viewability level, for example.

As described above, with the video monitoring device 100 or the video monitoring method according to the first embodiment, it is possible to preestimate the time series-wise positional relationship between the mobile object and each PTZ camera, select a video with the highest viewability to the observer from the videos captured by the plurality of PTZ cameras as a plurality of narrow area monitoring cameras based on the positional relationship, and display the selected video on the narrow area monitor screen 220.

Further, zapping, as a phenomenon in which the video displayed on the narrow area monitor screen 220 is switched frequently, is unlikely to occur since the selection of the PTZ camera is made based on the time series-wise positional relationship between each PTZ camera and the mobile object.

Second Embodiment

The second embodiment differs from the first embodiment in using the occlusion occurrence level as the viewability level. Except for this feature, the second embodiment is the same as the first embodiment. Thus, FIG. 1 and FIG. 2 are also referred to in the description of the second embodiment.

Figure 8:
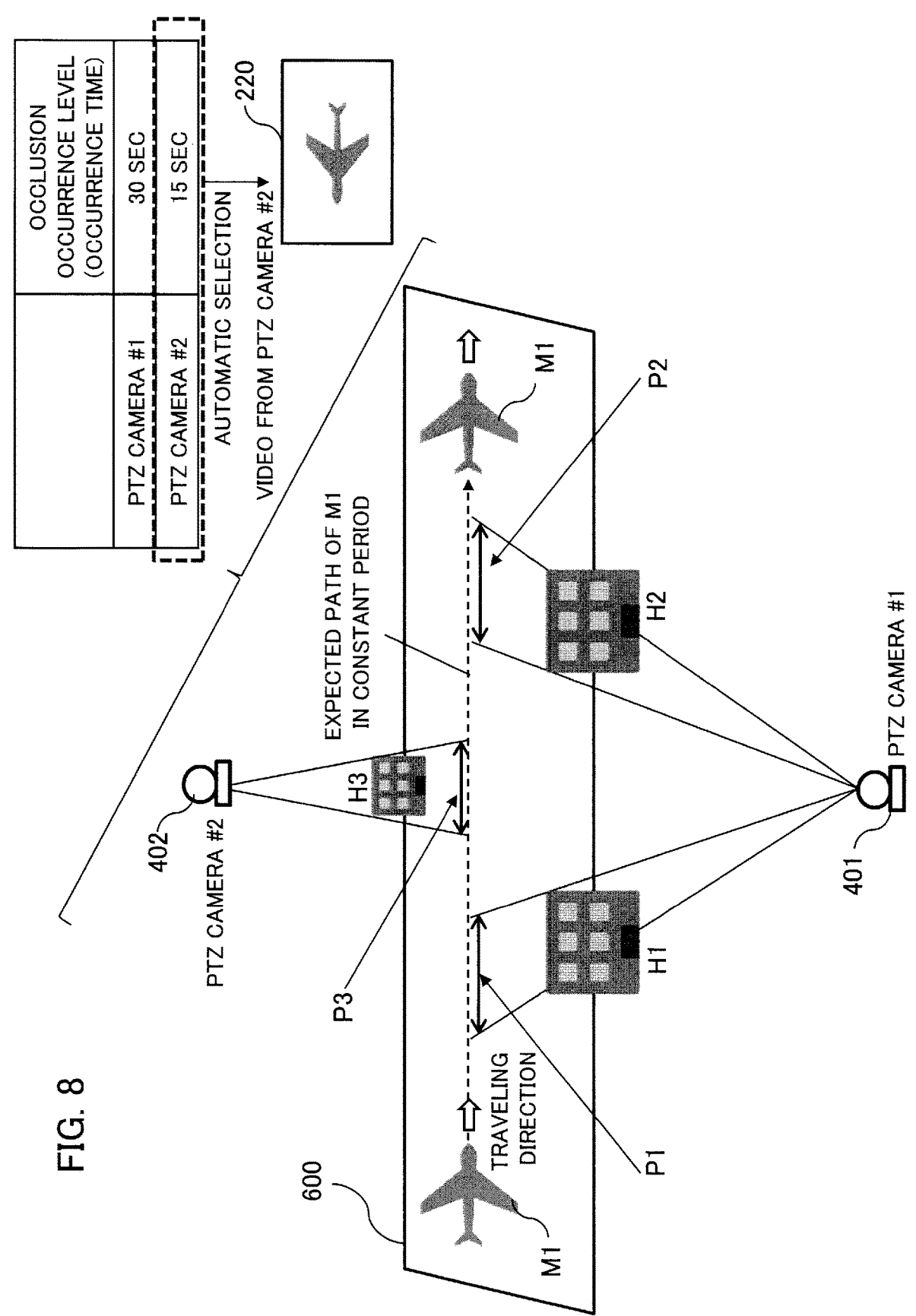
FIG. 8 is a diagram showing an example of employing a video monitoring system according to a second embodiment for monitoring an airplane traveling in an airport.

FIG. 8 is a diagram showing an example of employing a video monitoring system according to the second embodiment for monitoring an airplane M1 traveling in an airport. In the example of FIG. 8, the PTZ camera (#1) 401 swivels following the airplane M1 traveling in the airport, in which a screening object H1 such as a building causes occlusion for an occlusion occurrence time P1 during which the image capturing of the airplane M1 is impossible, and a screening object H2 such as a building causes occlusion for an occlusion occurrence time P2 during which the image capturing of the airplane M1 is impossible. Further, in the example of FIG. 8, the PTZ camera (#2) 402 swivels following the airplane M1 traveling in the airport, in which a screening object H3 such as a building causes occlusion for an occlusion occurrence time P3 during which the image capturing of the airplane M1 is impossible. For example, when P1+P2=30 seconds and P3=15 seconds, the PTZ camera (#2) 402 with the shorter occlusion occurrence time provides the higher viewability level, and thus the video from the PTZ camera (#2) 402 is automatically selected and displayed on the narrow area monitor screen 220.

Figure 9:
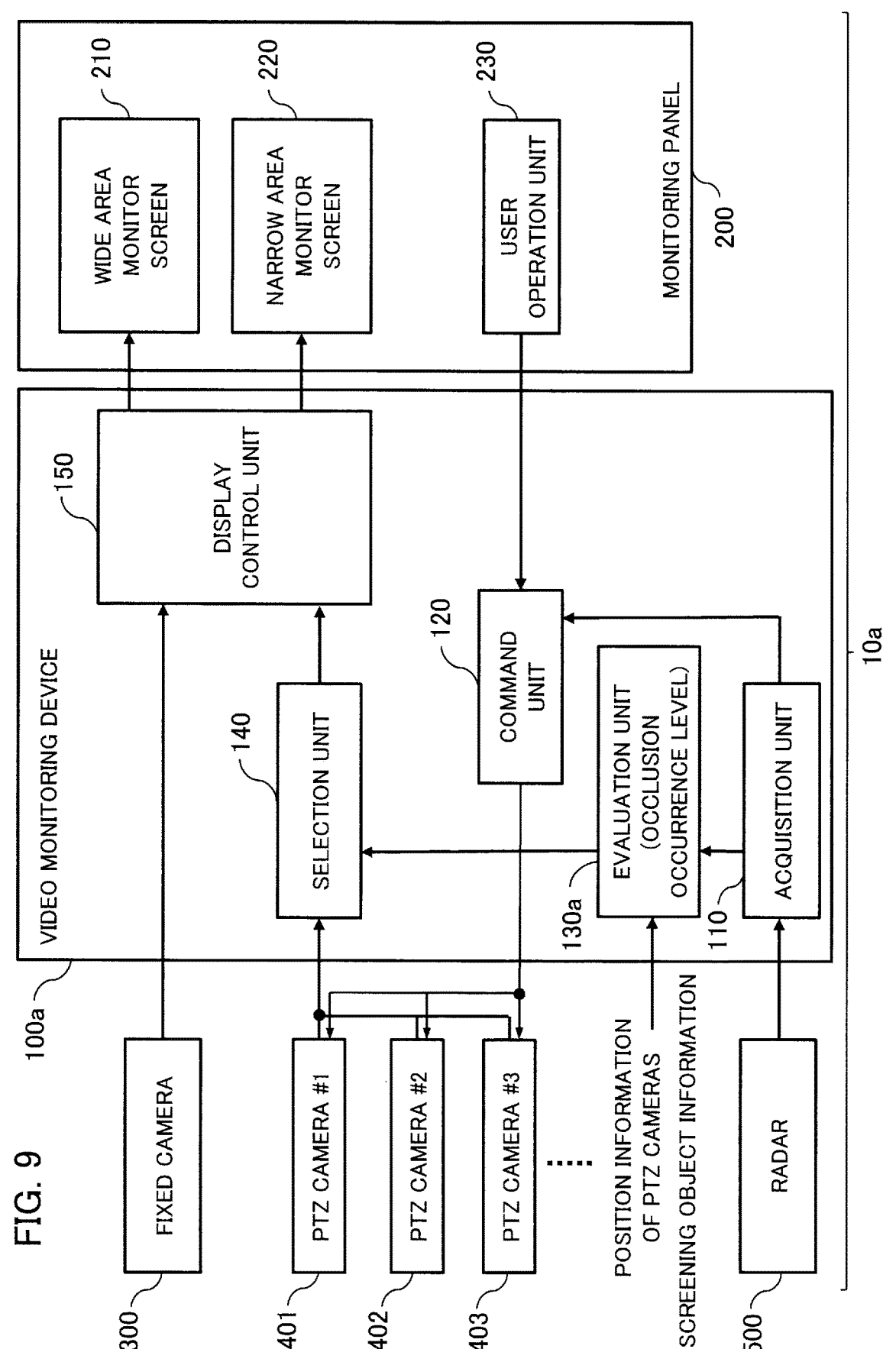
FIG. 9 is a functional block diagram schematically showing a configuration of a video monitoring device and the video monitoring system according to the second embodiment.

FIG. 9 is a functional block diagram schematically showing a configuration of a video monitoring device 100a and a video monitoring system 10a according to the second embodiment. In FIG. 9, each component identical or corresponding to a component shown in FIG. 4 is assigned the same reference character as in FIG. 4.

The video monitoring system 10a includes the video monitoring device 100a, the monitoring panel 200, the one or more fixed cameras 300, the plurality of PTZ cameras (#1-#3) 401-403, and the radar 500 that detects the position of the airplane M1 as the mobile object traveling in the airport. The video monitoring device 100a displays a video from a fixed camera 300 or a synthetic video of videos from a plurality of fixed cameras 300 on the wide area monitor screen 210.

Further, the video monitoring device 100a acquires position information indicating the position of the airplane M1 moving on a taxiway, a runway or the like in the airport by using the radar 500, commands the image capturing directions of the PTZ cameras (#1-#3) 401-403 provided at the predetermined positions, evaluates the viewability level of the airplane M1 in the video captured by each of the PTZ cameras (#1-#3) 401-403 based on the position of the airplane M1 and the positions of the PTZ cameras (#1-#3) 401-403, selects a PTZ camera for use for the image capturing of the airplane M1 from the PTZ cameras (#1-#3) 401-403 based on the viewability level, and displays the video of the airplane M1 captured by the selected PTZ camera on the narrow area monitor screen 220. Furthermore, the airplane M1 as the mobile object as the monitoring target is designated by the observer through the user operation unit 230, for example.

In the second embodiment, the viewability level is evaluated based on the occlusion occurrence level of each of the PTZ cameras (#1-#3) 401-403. In the video monitoring device 100a, an evaluation unit 130a calculates the occlusion occurrence time based on position information and screening object information regarding each PTZ camera and selects the video to be displayed on the narrow area monitor screen 220 based on the occlusion occurrence level corresponding to the occlusion occurrence time.

Figure 10:
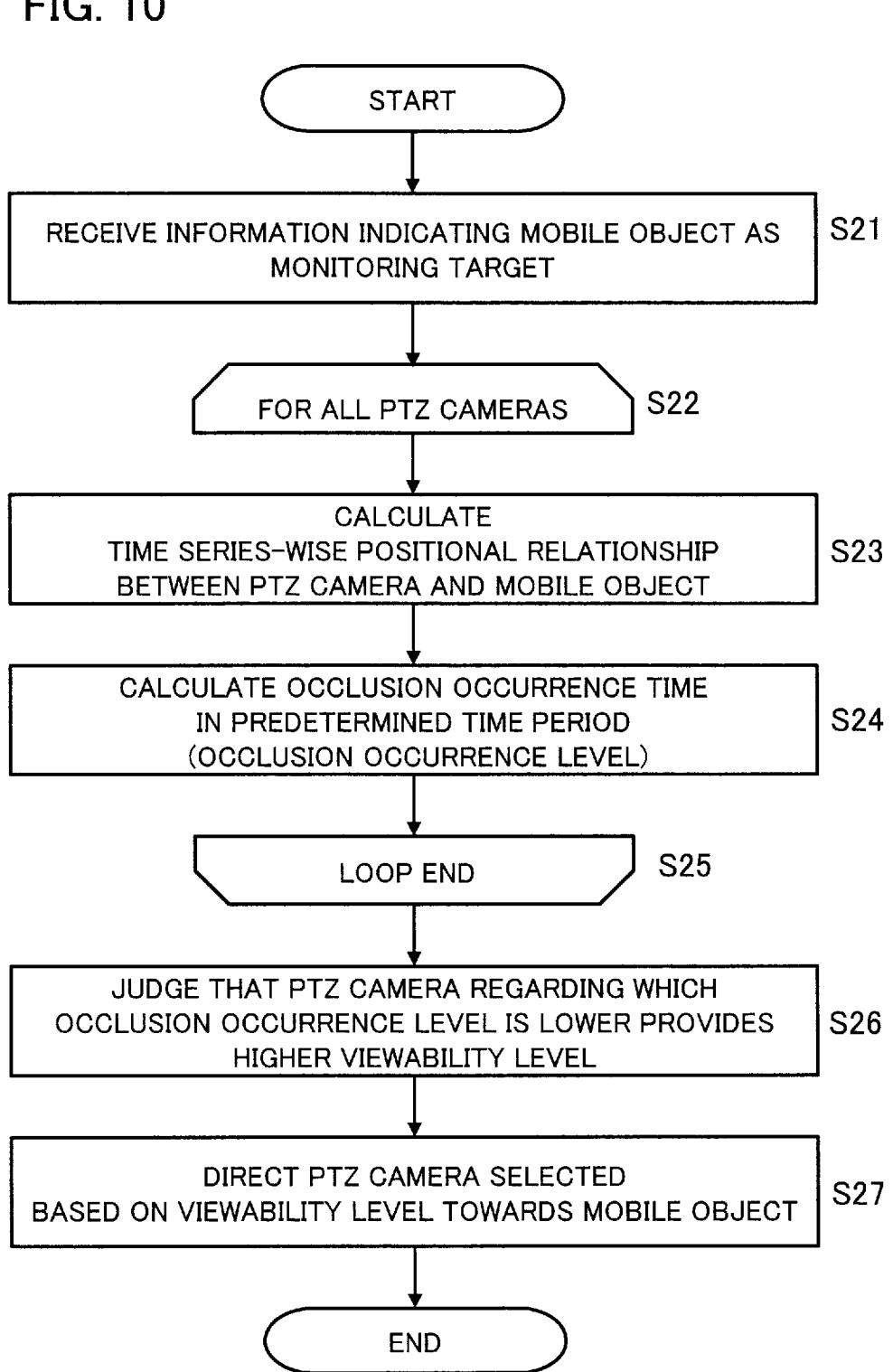
FIG. 10 is a flowchart showing an operation of the video monitoring device according to the second embodiment.

FIG. 10 is a flowchart showing an operation of the video monitoring device 100a according to the second embodiment. First, the acquisition unit 110 acquires the position information indicating the position of the mobile object as the moving monitoring target (in the second embodiment, an airplane traveling in the airport) (step S21).

The evaluation unit 130a executes a process of calculating the time series-wise positional relationship between a PTZ camera and the mobile object (step S23) and calculating the occlusion occurrence time in a predetermined time period (step S24) for all of the plurality of PTZ cameras (steps S22 to S25).

The evaluation unit 130a judges that a PTZ camera regarding which the occlusion occurrence level corresponding to the occlusion occurrence time is lower provides a higher viewability level (step S26). The command unit 120 directs a PTZ camera selected based on the viewability level towards the mobile object as the monitoring target (step S27). In this case, the command unit 120 selects a PTZ camera that provides the highest viewability level, for example.

As described above, with the video monitoring device 100*a* or the video monitoring method according to the second embodiment, a video with the highest viewability to the observer, selected from the plurality of videos captured by the plurality of PTZ cameras as the plurality of narrow area monitoring cameras, can be displayed on the narrow area monitor screen 220.

Further, the zapping, as the phenomenon in which the video displayed on the narrow area monitor screen 220 is switched frequently, is unlikely to occur since the selection of the PTZ camera is made based on the time series-wise positional relationship between each PTZ camera and the mobile object.

Third Embodiment

The third embodiment differs from the first embodiment in using the trackability level and the feature level as the viewability level. Except for this feature, the third embodiment is the same as the first embodiment. Thus, FIG. 1 and FIG. 2 are also referred to in the description of the third embodiment.

Figure 11:
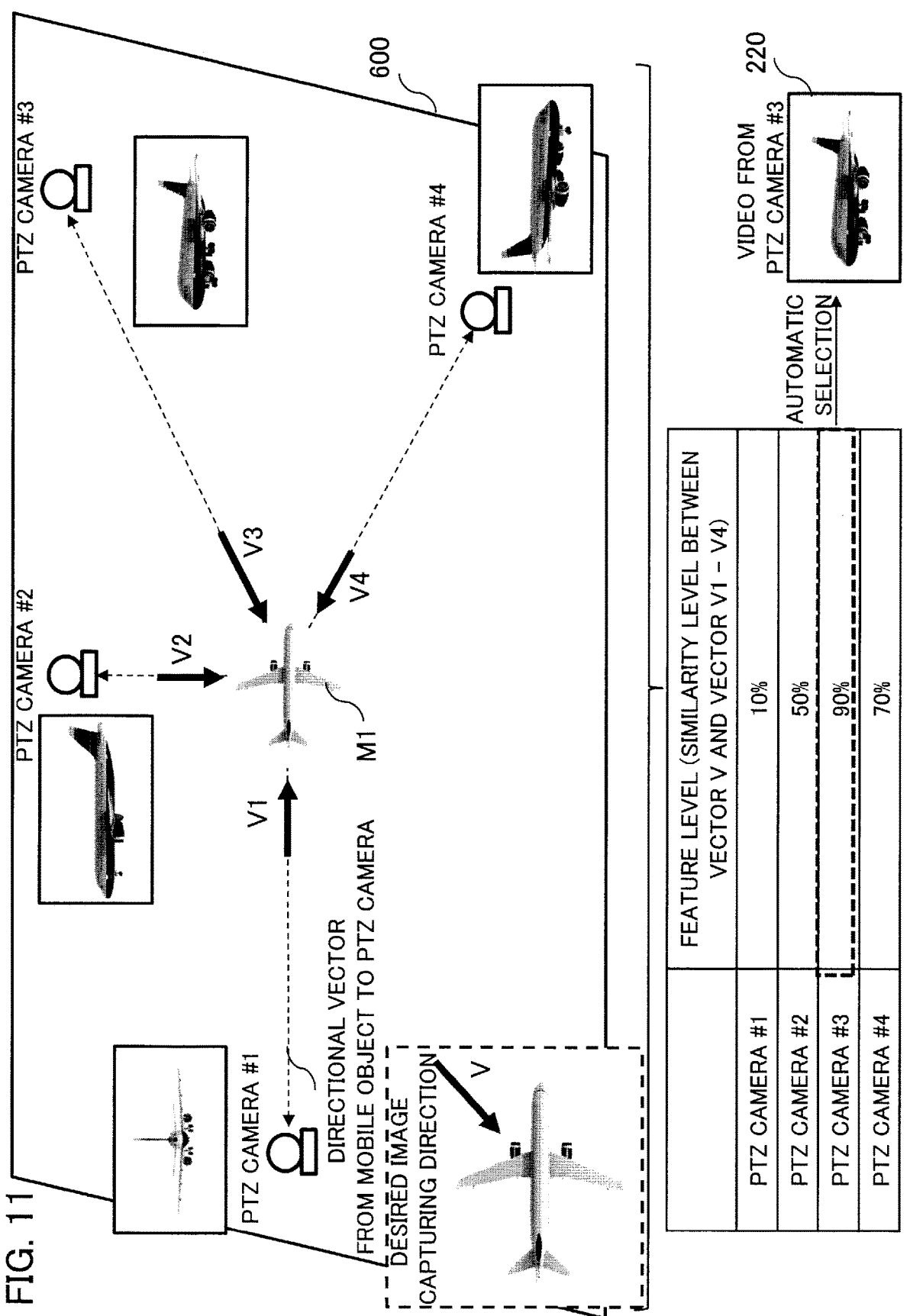
FIG. 11 is a diagram showing a feature level as an example of the viewability level.

FIG. 11 is a diagram showing examples of the feature level as the viewability level. In the example of FIG. 11, when a vector V of a desired image capturing direction has been designated (e.g., when the vector V has been designated by a user operation or the vector V has previously been determined), the evaluation unit automatically selects a PTZ camera having an image capturing direction vector similar to the vector V, and has the video from the automatically selected PTZ camera displayed on the narrow area monitor screen 220. In the example of FIG. 11, the feature level is calculated as a similarity level between the vector V of the desired image capturing direction and the image capturing direction vector V1-V4 of each PTZ camera, for example. In the example of FIG. 11, the vector V3 among the image capturing direction vectors V1-V4 is the most similar to the vector V of the desired image capturing direction, and thus the PTZ camera (#3) 403 is automatically selected. The vector V may also be previously determined depending on the type of the mobile object. Further, the vector V may also be determined according to a command inputted by the observer.

Figure 12:
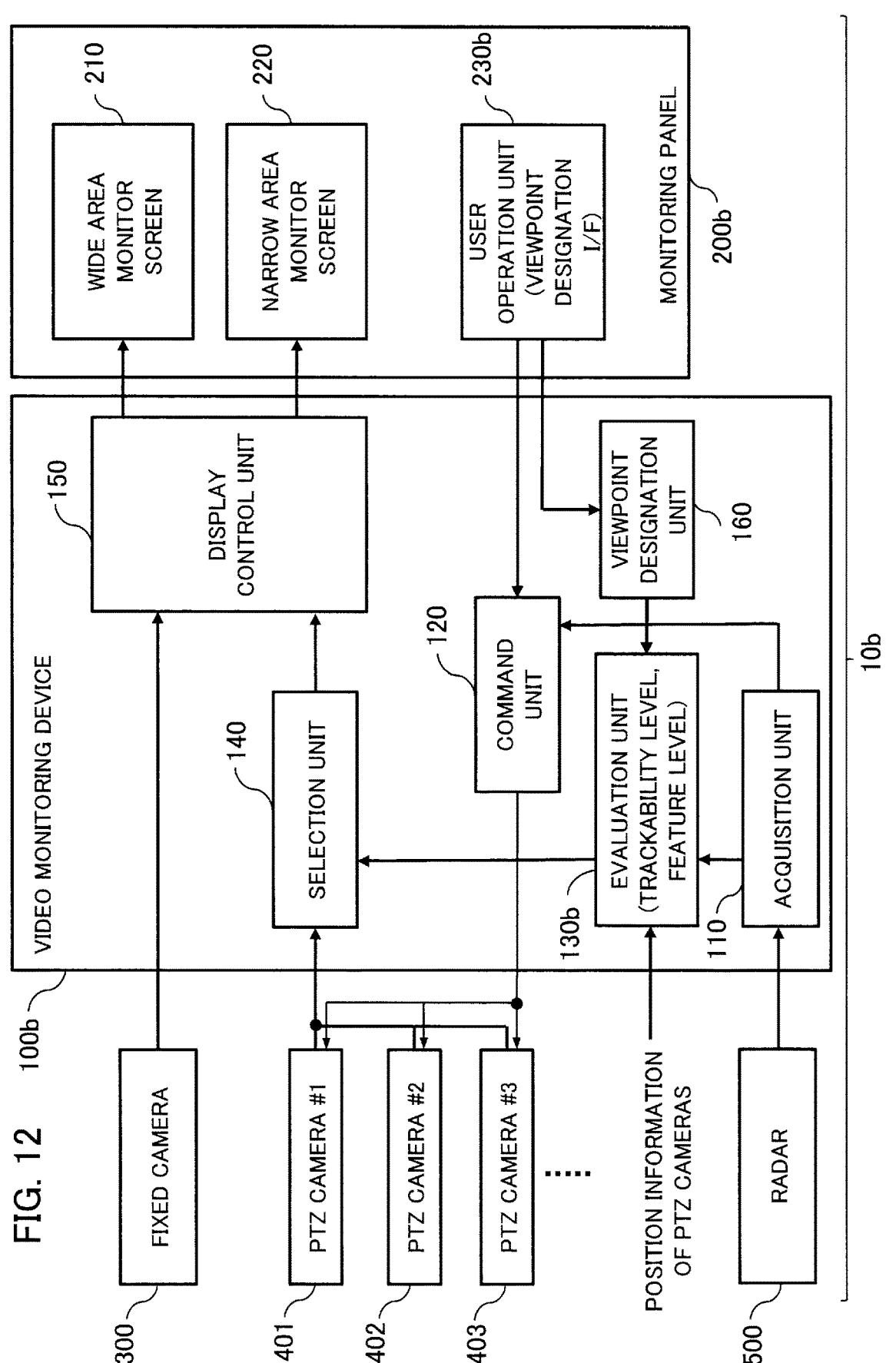
FIG. 12 is a functional block diagram schematically showing a configuration of a video monitoring device and a video monitoring system according to a third embodiment.

FIG. 12 is a functional block diagram schematically showing a configuration of a video monitoring device 100*b* and a video monitoring system 10*b* according to the third embodiment. In FIG. 12, each component identical or corresponding to a component shown in FIG. 4 is assigned the same reference character as in FIG. 4. In the video monitoring device 100*b* shown in FIG. 12, an evaluation unit 130*b* calculates the trackability level and the feature level based on viewpoint designation information inputted from a user operation unit via a viewpoint designation unit 160 and the position information regarding each PTZ camera, and selects the video to be displayed on the narrow area monitor screen 220 based on an overall evaluation value as a combination of the trackability level and the feature level. The overall evaluation value is calculated by weighted addition of the trackability level and the feature level, for example. Let w1 represent a weight coefficient for the trackability level and w2 represent a weight coefficient for the feature level, the overall evaluation value E is calculated according to the following expression:

$$E=(\text{trackability level})\times(w1)+(\text{feature level})\times(w2)$$

Figure 13:
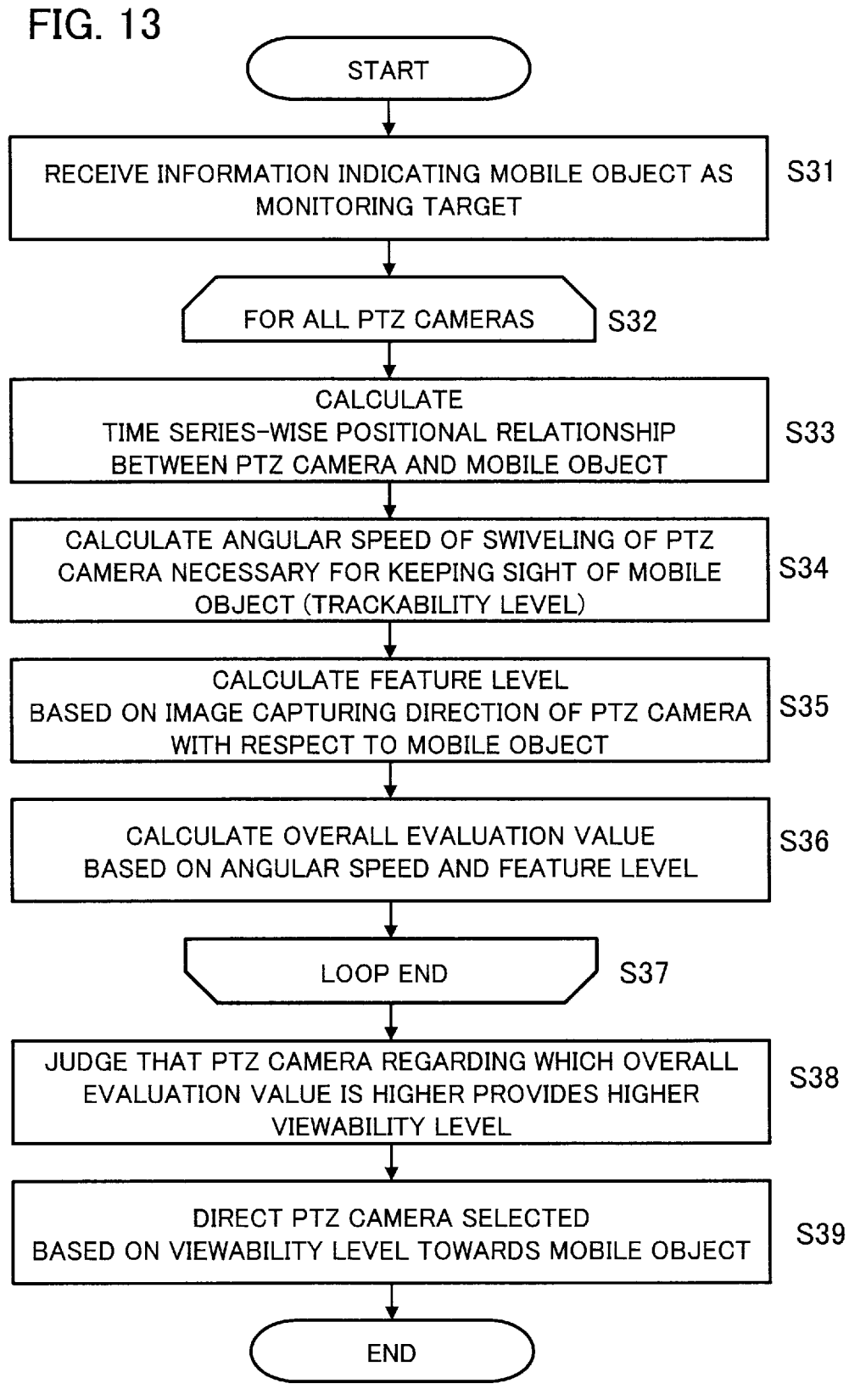
FIG. 13 is a flowchart showing an operation of the video monitoring device according to the third embodiment.

FIG. 13 is a flowchart showing an operation of the video monitoring device 100*b* according to the third embodiment.

First, the acquisition unit 110 acquires the position information indicating the position of the mobile object as the moving target object (in the third embodiment, an airplane traveling in the airport) (step S31).

The evaluation unit 130*b* executes a process of calculating the time series-wise positional relationship between a PTZ camera and the mobile object (step S33), calculating the angular speed of the swiveling of the PTZ camera necessary for keeping sight of the mobile object (step S34), calculating the feature level of the mobile object (step S35), and calculating the overall evaluation value (step S36) for all of the plurality of PTZ cameras (steps S32 to S37).

The evaluation unit 130*b* judges that a PTZ camera regarding which the overall evaluation value is higher provides a higher viewability level (step S38). The command unit 120 directs a PTZ camera selected based on the viewability level towards the mobile object as the monitoring target (step S39). In this case, the command unit 120 selects a PTZ camera that provides the highest viewability level, for example.

Figure 14:
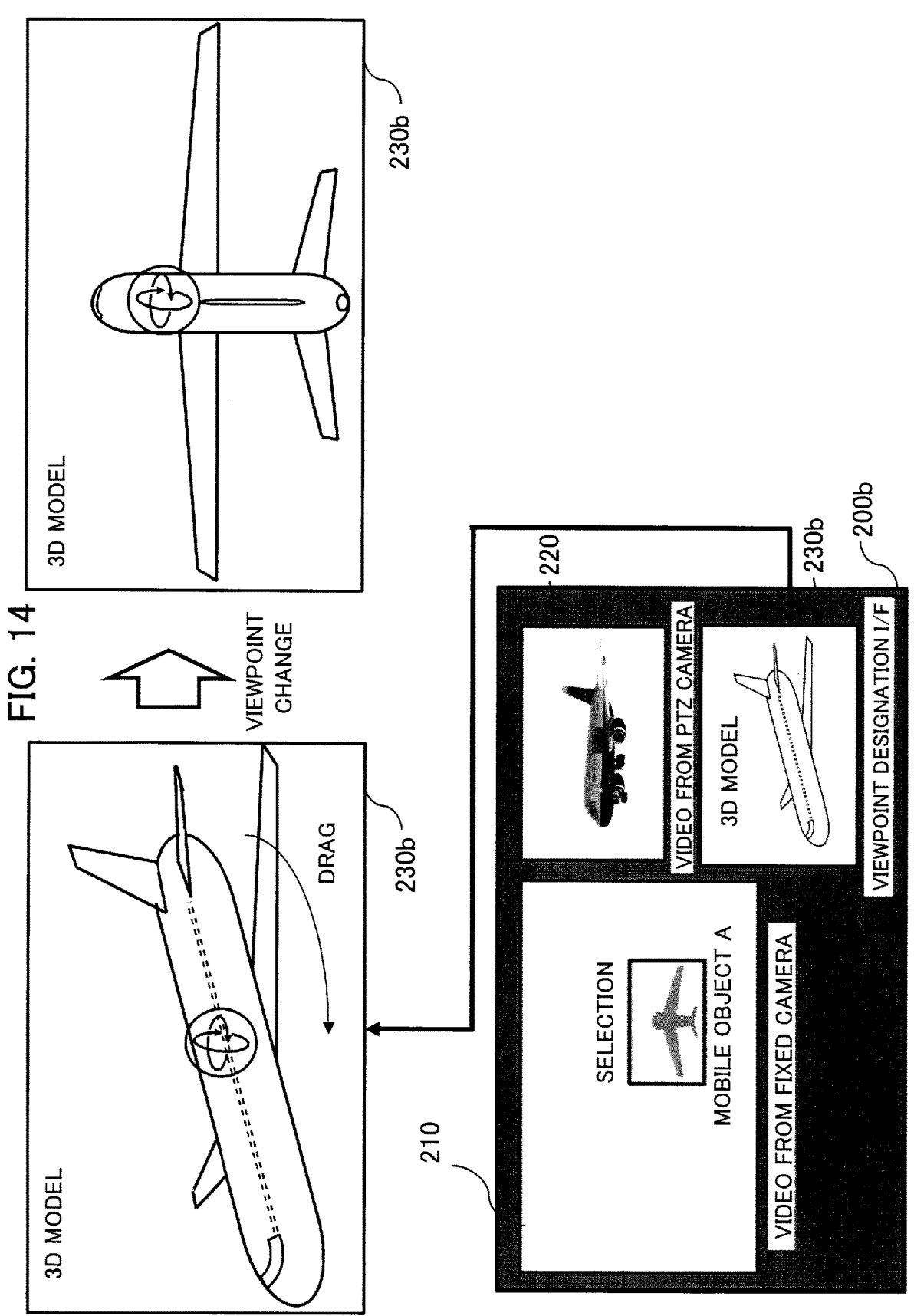
FIG. 14 is a diagram showing a viewpoint designation operation executed by the video monitoring system according to the third embodiment.

FIG. 14 is a diagram showing a viewpoint designation operation executed by the video monitoring system 10*b* according to the third embodiment. The vector V of the image capturing direction is inputted by dragging the display on the narrow area monitor screen 220 of a monitoring panel 200*b* so as to rotate a three-dimensional model (i.e., 3D model) of the airplane viewed obliquely from the front in the video and have a rear part of the airplane 3D model displayed in the video. This operation may also be performed by using a user operation unit 230*b* such as a mouse, a switch or a touch panel.

Figure 15:
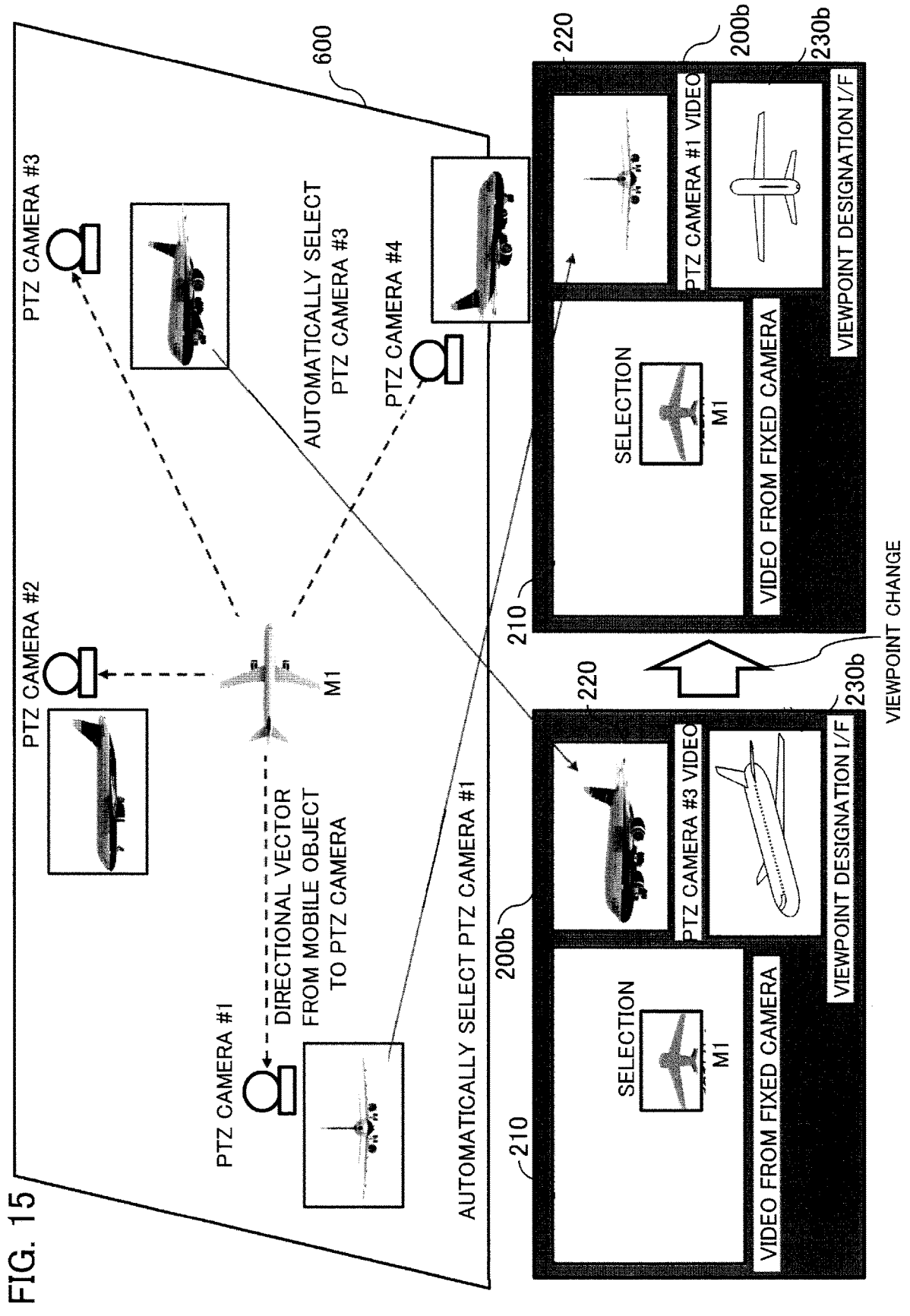
FIG. 15 is a diagram showing the viewpoint designation operation executed by the video monitoring system according to the third embodiment and videos captured by PTZ cameras.

FIG. 15 is a diagram showing the viewpoint designation operation executed by the video monitoring system 10*b* according to the third embodiment and the videos captured by the PTZ cameras. FIG. 15 shows a state in which the vector V of the image capturing direction is inputted by dragging the display on the narrow area monitor screen 220 so as to rotate the 3D model of the airplane in the video and have the rear part of the airplane 3D model displayed in the video as illustrated, in which the video from the PTZ camera (#3) was displayed on the narrow area monitor screen 220 before a viewpoint change operation through a viewpoint change I/F, whereas the video from the PTZ camera (#1) is displayed on the narrow area monitor screen 220 after the viewpoint change operation through the viewpoint change I/F.

As described above, with the video monitoring device 100*b* or the video monitoring method according to the third embodiment, a video with the highest viewability to the observer, selected from the plurality videos captured by the plurality of PTZ cameras as the plurality of narrow area monitoring cameras, can be automatically displayed on the narrow area monitor screen 220.

Further, by performing an intuitive and comprehensible operation of rotating the 3D model of the airplane as the mobile object as the monitoring target through the viewpoint change I/F, a designated video can be displayed on the narrow area monitor screen 220.

Fourth Embodiment

The fourth embodiment differs from the first embodiment in using the trackability level and the detail level as the viewability level. Except for this feature, the fourth embodiment is the same as the first embodiment. Thus, FIG. 1 and FIG. 2 are also referred to in the description of the fourth embodiment.

Figure 16:
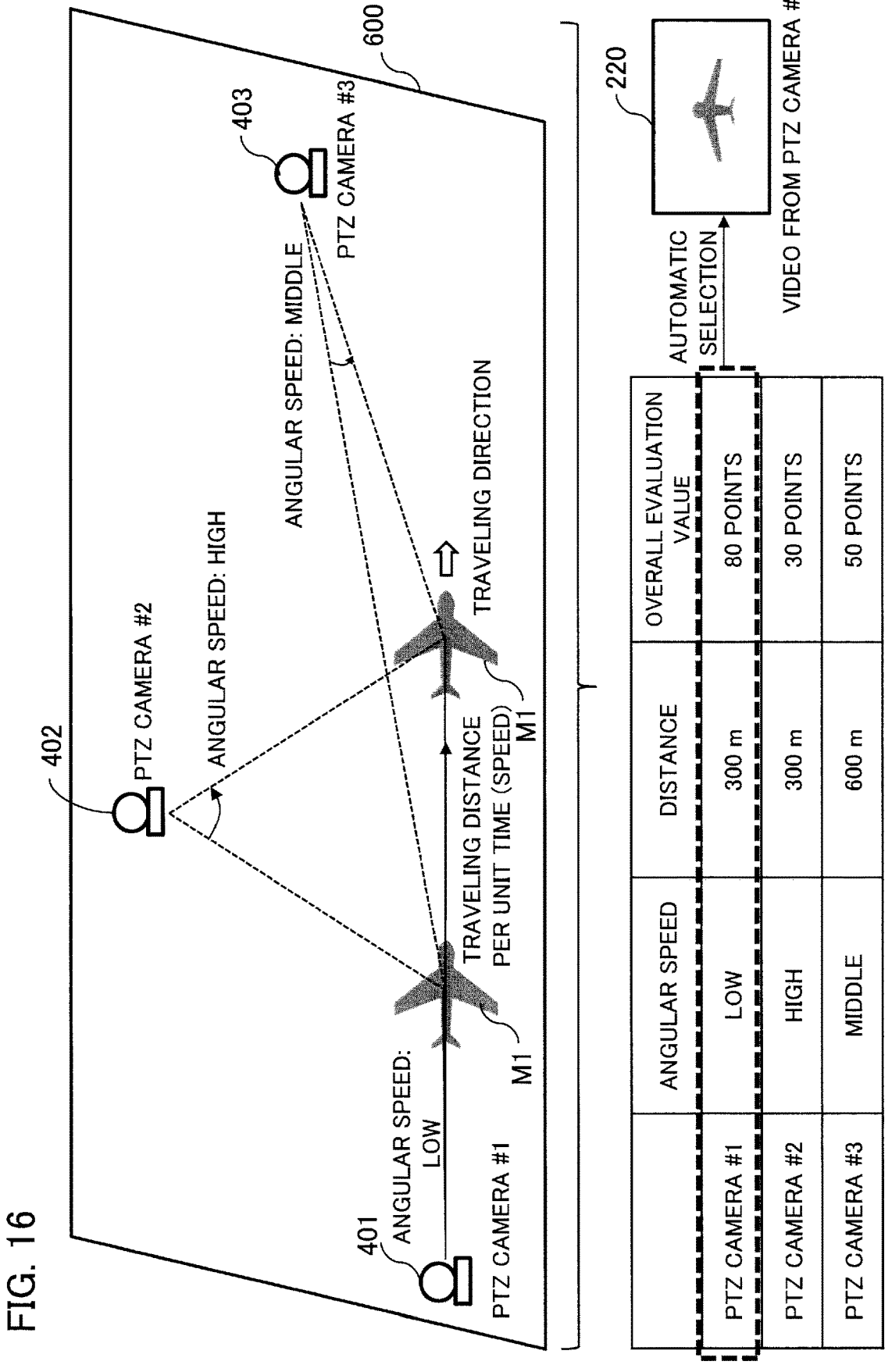
FIG. 16 is a diagram showing an example of employing a video monitoring system according to a fourth embodiment for monitoring an airplane traveling in an airport.

FIG. 16 is a diagram showing an example of employing a video monitoring system according to the fourth embodiment for monitoring an airplane M1 traveling in an airport. Each of the PTZ cameras (#1-#3) 401-403 swivels corresponding to the traveling distance per unit time (i.e., speed) of the airplane M1 as the mobile object as the monitoring target. In the example of FIG. 16, the angular speed of the swiveling of the PTZ camera (#1) 401 is low. Further, in the example of FIG. 16, the angular speed of the swiveling of the PTZ camera (#2) 402 is high. Furthermore, in the example of FIG. 16, the angular speed of the swiveling of the PTZ camera (#3) 403 is middle. Moreover, in the example of FIG. 16, the distance from the PTZ camera (#1) 401 to the airplane M1 is 300 m, the distance from the PTZ camera (#2) 402 to the airplane is 300 m, and the distance from the PTZ camera (#3) 403 to the airplane M1 is 600 m. In terms of an overall evaluation value obtained by the weighted addition of these values, the PTZ camera (#1) 401 is the highest. Therefore, the selection unit 140 sends the video from the PTZ camera (#1) 401 regarding which the angular speed of the swiveling is the lowest, to the display control unit 150 and thereby has the video from the PTZ camera (#1) 401 displayed on the narrow area monitor screen 220.

Figure 17:
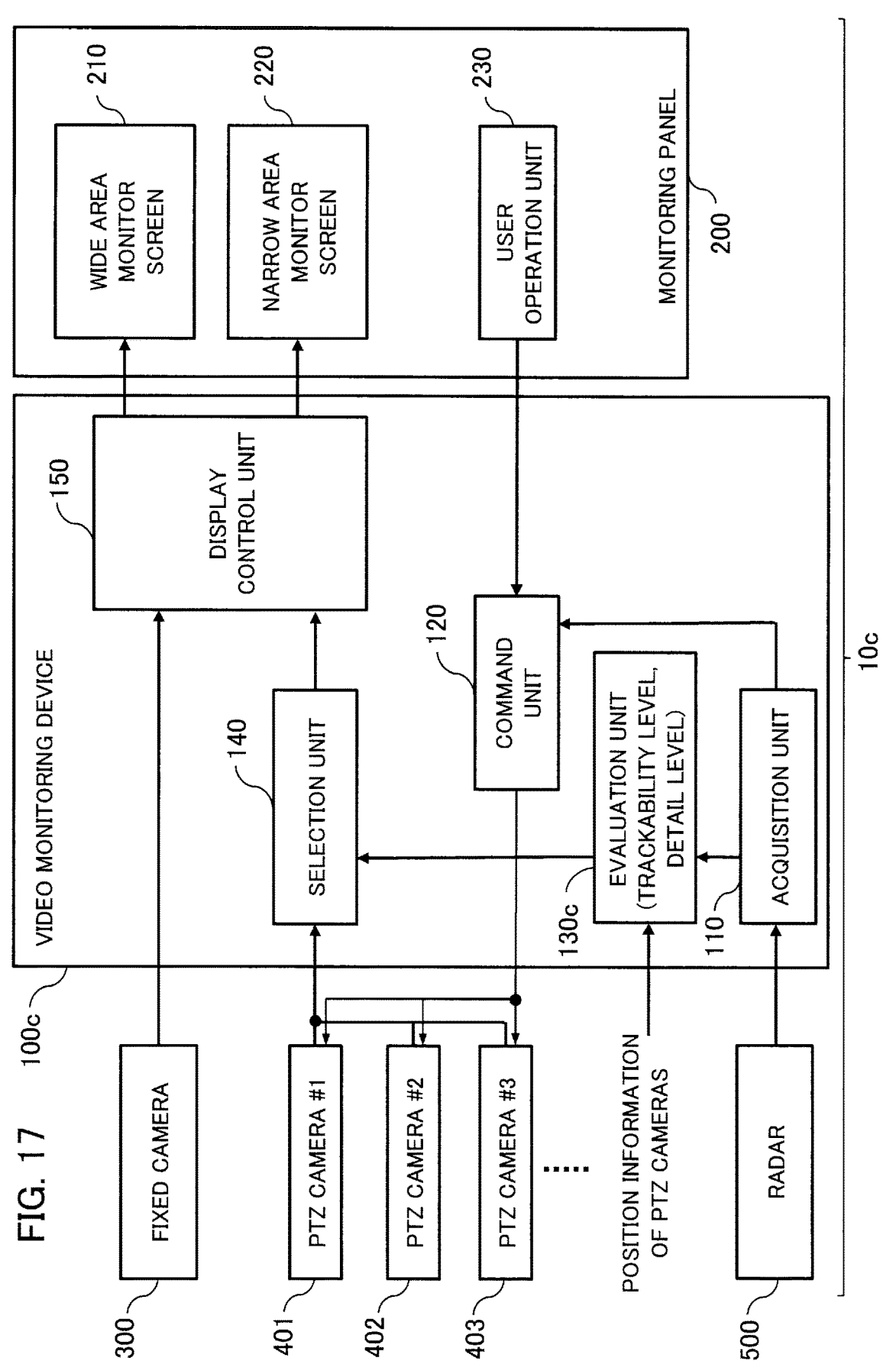
FIG. 17 is a functional block diagram schematically showing a configuration of a video monitoring device and the video monitoring system according to the fourth embodiment.

FIG. 17 is a functional block diagram schematically showing a configuration of a video monitoring device 100c and a video monitoring system 10c according to the fourth embodiment. In FIG. 17, each component identical or corresponding to a component shown in FIG. 4 is assigned the same reference character as in FIG. 4. In the video monitoring device 100c shown in FIG. 17, an evaluation unit 130c calculates the trackability level and the detail level based on the position information regarding each PTZ camera, and selects the video to be displayed on the narrow area monitor screen 220 based on the overall evaluation value as a combination of the trackability level and the detail level.

Figure 18:
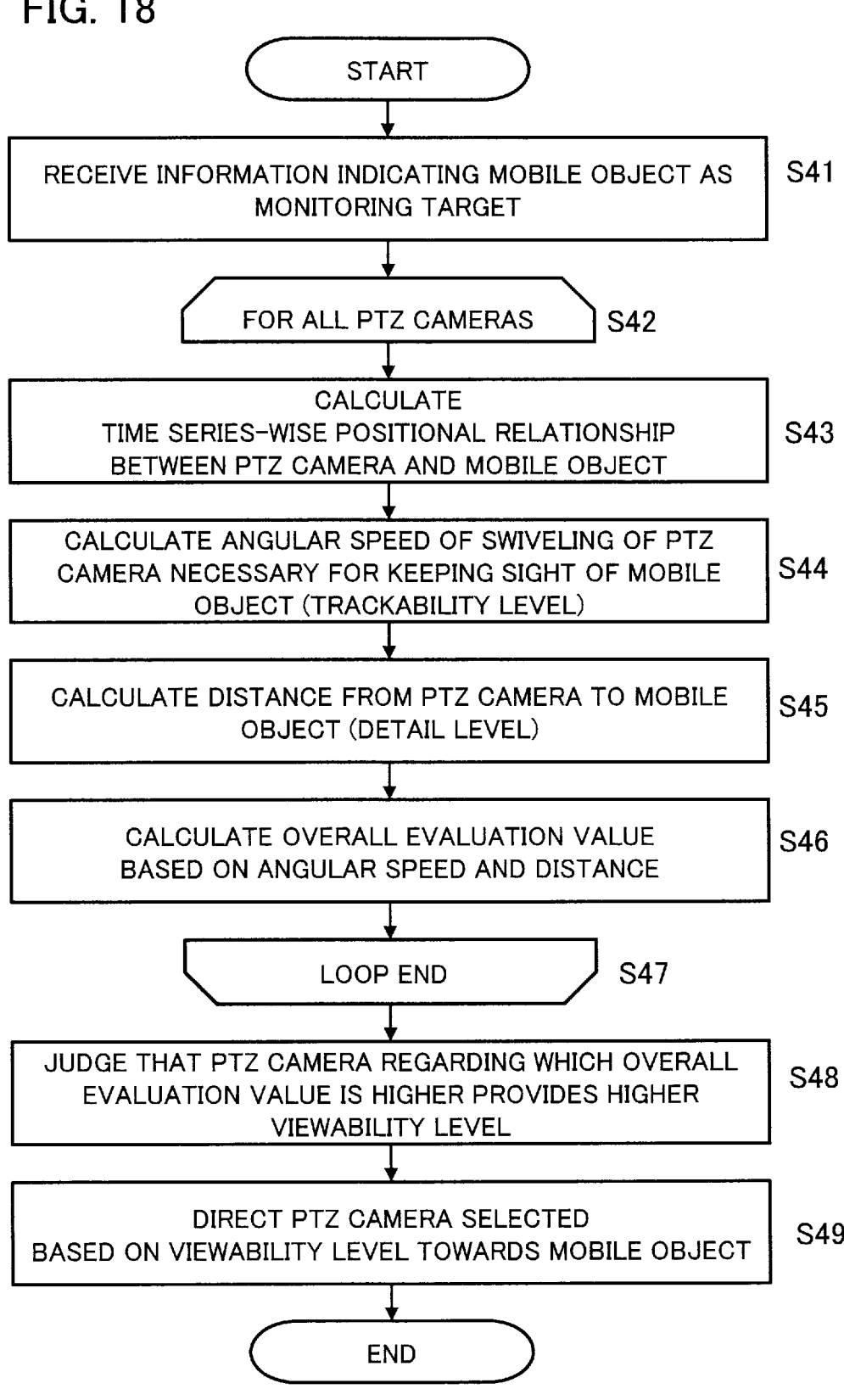
FIG. 18 is a flowchart showing an operation of the video monitoring device according to the fourth embodiment.

FIG. 18 is a flowchart showing an operation of the video monitoring device according to the fourth embodiment. First, the acquisition unit 110 acquires the position information indicating the position of the mobile object as the moving target object (in the fourth embodiment, an airplane traveling in the airport) (step S41).

The evaluation unit 130c executes a process of calculating the time series-wise positional relationship between a PTZ camera and the mobile object (step S43), calculating the angular speed of the swiveling of the PTZ camera necessary for keeping sight of the mobile object (step S44), calculating the detail level of the mobile object (step S45), and calculating the overall evaluation value (step S46) for all of the plurality of PTZ cameras (steps S42 to S47).

The evaluation unit 130c judges that a PTZ camera regarding which the overall evaluation value is higher provides a higher viewability level (step S48). The command unit 120 directs a PTZ camera selected based on the viewability level towards the mobile object as the monitoring target (step S49). In this case, the command unit 120 selects a PTZ camera that provides the highest viewability level, for example.

As described above, with the video monitoring device 100c or the video monitoring method according to the fourth embodiment, a video with the highest viewability to the observer, selected from the plurality of videos captured by the plurality of PTZ cameras as the plurality of narrow area monitoring cameras, can be automatically displayed on the narrow area monitor screen 220.

Modification

The above description has been given of cases where the mobile object is an airplane and video monitoring systems for monitoring an airplane traveling in an airport. However, the mobile object is not limited to an airplane. The mobile object can also be an automobile traveling on a road, a marine vessel moving on the water, an airplane flying in the air, a person walking on a passage, or the like.

In the above description, the viewability level is determined based on one of the trackability level, the occlusion occurrence level, the detail level and the feature level or the overall evaluation value obtained by the weighted addition of two or more of these values, and the PTZ camera for use for tracking the mobile object is determined based on the viewability level. However, the video monitoring device may also be configured to be able to change which one of the trackability level, the occlusion occurrence level, the detail level, the feature level and combinations of some of these values should be used for evaluating the viewability level based on a user operation or the type of the mobile object. For example, the video monitoring device may evaluate the viewability level based on the occlusion occurrence level when the mobile object as the monitoring target is an airplane traveling in an airport and evaluate the viewability level based on the trackability level when the mobile object as the monitoring target is an airplane flying in the air.

While the above description has been given of examples in which the video monitoring system includes one narrow area monitor screen 220, the video monitoring system may also be configured to include a plurality of narrow area monitor screens 220. In such cases, a plurality of videos may be displayed in descending order of the viewability level.

DESCRIPTION OF REFERENCE CHARACTERS

10, 10a-10c: video monitoring system, 100, 100a-100c: video monitoring device, 110: acquisition unit, 120: command unit, 130, 130a-130c: evaluation unit, 140: selection unit, 150: display control unit, 160: viewpoint designation unit, 200, 200b: monitoring panel, 210: wide area monitor screen, 220: narrow area monitor screen (monitor screen), 230, 230b: user operation unit, 300: fixed camera, 401-403: PTZ camera (movable camera), 500: radar, 600: airport, D1-D3: image capturing direction, M1, M2: airplane (mobile object), H1-H3: screening object.

What is claimed is:

1. A video monitoring device comprising:
processing circuitry to acquire position information indicating a position of a mobile object as a moving target object;
to command image capturing directions of a plurality of movable cameras provided at predetermined positions;
to evaluate a viewability level of the mobile object in a video captured by each of the plurality of movable cameras based on the position of the mobile object and the positions of the plurality of movable cameras;
to automatically select a movable camera for use for image capturing of the mobile object from the plurality of movable cameras based on the viewability level;
to automatically control the selected movable camera so that the movable camera is directed toward the mobile object; and
to display the video of the mobile object captured by the selected movable camera on a monitor screen,
wherein the viewability level is evaluated based on an angular speed of swiveling of each of the plurality of movable cameras necessary for each of the plurality of movable cameras to keep sight of the mobile object, and wherein the processing circuitry automatically selects and controls the movable camera, based on the angular speed of swiveling of each of the plurality of movable cameras.

2. The video monitoring device according to claim 1, wherein the viewability level is evaluated based on the angular speed, and the viewability level increases with a decrease in the angular speed.

3. The video monitoring device according to claim 1, wherein the viewability level of the mobile object in the video captured by each of the plurality of movable cameras is evaluated based on the angular speed and a distance between the position of the mobile object and the position of each of the plurality of movable cameras.

4. The video monitoring device according to claim 1, wherein the viewability level of the mobile object in the video captured by each of the plurality of movable cameras is evaluated based on the angular speed and a feature level of the mobile object included in the video captured by each of the plurality of movable cameras, and the feature level is calculated as a similarity level between a vector of a desired image capturing direction and a vector of the image capturing direction of each of the plurality of movable cameras.

5. The video monitoring device according to claim 1, wherein the viewability level of the mobile object in the video captured by each of the plurality of movable cameras is evaluated based on the angular speed, a distance between the position of the mobile object and the position of each of the plurality of movable cameras, and a feature level of the mobile object included in the video captured by each of the plurality of movable cameras, and the feature level is determined based on a predetermined part or a part designated by a user in the mobile object.

6. The video monitoring device according to claim 1, wherein the viewability level is evaluated based on the angular speed and an occlusion occurrence level corresponding to an occurrence time of occlusion occurring when each of the plurality of movable cameras keeps track of the mobile object for a predetermined time, and the viewability level increases with a decrease in the angular speed and with a decrease in the occlusion occurrence level.

7. The video monitoring device according to claim 6, wherein the viewability level of the mobile object in the video captured by each of the plurality of movable cameras is evaluated based on the angular speed, the occlusion occurrence level, and a distance between the position of the mobile object and the position of each of the plurality of movable cameras.

8. The video monitoring device according to claim 6, wherein the viewability level of the mobile object in the video captured by each of the plurality of movable cameras is evaluated based on the angular speed, the occlusion occurrence level, and a feature level of the mobile object included in the video captured by each of the plurality of movable cameras, and the feature level is calculated as a similarity level between a vector of a desired image capturing direction and a vector of the image capturing direction of each of the plurality of movable cameras.

9. The video monitoring device according to claim 6, wherein the viewability level of the mobile object in the video captured by each of the plurality of movable cameras is evaluated based on the angular speed, the occlusion occurrence level, a distance between the position of the mobile object and the position of each of the plurality of movable cameras, and a feature level of the mobile object included in the video captured by each of the plurality of movable cameras, and the feature level is calculated as a similarity level between a vector of a desired image capturing direction and a vector of the image capturing direction of each of the plurality of movable cameras.

10. The video monitoring device according to claim 1, wherein a desired image capturing direction is determined and the viewability level of the mobile object in the video captured by each of the plurality of movable cameras is evaluated based on an operation performed on a user operation unit having a display function of displaying a model simulating the mobile object and an operation function of rotating the model according to a user operation.

11. A video monitoring system comprising:
the video monitoring device according to claim 1; and
the plurality of movable cameras.

12. A video monitoring method executed by a computer, the method comprising:

acquiring position information indicating a position of a mobile object as a moving target object;

commanding image capturing directions of a plurality of movable cameras provided at predetermined positions;

evaluating a viewability level of the mobile object in a video captured by each of the plurality of movable cameras based on the position of the mobile object and the positions of the plurality of movable cameras;

automatically selecting a movable camera for use for image capturing of the mobile object from the plurality of movable cameras based on the viewability level;

automatically controlling the selected movable camera so that the movable camera is directed toward the mobile object; and displaying the video of the mobile object captured by the selected movable camera on a monitor screen, wherein the viewability level is evaluated based on an angular speed of swiveling of each of the plurality of movable cameras necessary for each of the plurality of movable cameras to keep sight of the mobile object, and wherein the method further comprises automatically selecting and controlling the movable camera, based on the angular speed of swiveling of each of the plurality of movable cameras.

13. A non-transitory computer readable medium storing a video monitoring program that causes a computer to execute the video monitoring method according to claim 12.

* * * * *